US012328713B2

(12) United States Patent
Bai et al.

(10) Patent No.: US 12,328,713 B2
(45) Date of Patent: Jun. 10, 2025

(54) TECHNIQUES FOR SLOT AGGREGATION IN FULL DUPLEX WIRELESS COMMUNICATIONS SYSTEMS

(71) Applicant: QUALCOMM Incorporated, San Diego, CA (US)

(72) Inventors: Tianyang Bai, Somerville, NJ (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 47 days.

(21) Appl. No.: 17/492,399

(22) Filed: Oct. 1, 2021

(65) Prior Publication Data
US 2022/0110117 A1    Apr. 7, 2022

Related U.S. Application Data

(60) Provisional application No. 63/087,779, filed on Oct. 5, 2020.

(51) Int. Cl.
*H04W 72/04* (2023.01)
*H04L 5/14* (2006.01)
(Continued)

(52) U.S. Cl.
CPC .......... *H04W 72/0446* (2013.01); *H04L 5/14* (2013.01); *H04W 72/23* (2023.01)

(58) Field of Classification Search
CPC ......... H04W 74/0808; H04W 72/0446; H04W 72/042; H04W 24/08; H04W 72/044;
(Continued)

(56) References Cited

U.S. PATENT DOCUMENTS 5,218,680 A * 6/1993 Farrell .................. H04L 9/40
709/215
8,160,101 B2   4/2012 Kwak et al.
(Continued)

FOREIGN PATENT DOCUMENTS

EP         3637836 A1    4/2020
WO    WO-2015096027 A1  7/2015
(Continued)

OTHER PUBLICATIONS

CATT: "TDD Inter-Band Carrier Aggregation", 3GPP Draft, R1-121081, 3GPP TSG RAN WG1 Meeting #68bis, 3rd Generation Partnership Project (3GPP), Mobile Competence Centre, 650, Route Des Lucioles, F-06921 Sophia-Antipolis Cedex, France, vol. RAN WG1, No. Jeju, Korea, Mar. 26, 2012-Mar. 30, 2012, Mar. 20, 2012 (Mar. 30, 2012), XP050599384, 5 Pages, [retrieved on Mar. 20, 2012] Section 2.2.
(Continued)

*Primary Examiner* — Wei Zhao
(74) *Attorney, Agent, or Firm* — Holland & Hart LLP/QUALCOMM Incorporated

(57) ABSTRACT

Methods, systems, and devices for wireless communications are described. A communication device, such as a base station and a user equipment (UE) may communicate in a full duplex mode. The base station may transmit, to the UE, an indication of a configuration of a set of aggregated slots for wireless communications in the full duplex mode. The UE or the base station, or both, may determine a first beam pair for communications during a first subset of the aggregated slots. The UE or the base station, or both, may determine a second beam pair for communications during a second subset of the aggregated slots. The UE or the base station, or both, may communicate the wireless communications using the first beam pair during the first subset of
(Continued)

aggregated slots and the second beam pair during the second subset of aggregated slots.

50 Claims, 20 Drawing Sheets

(51) Int. Cl.
*H04W 72/0446* (2023.01)
*H04W 72/23* (2023.01)

(58) Field of Classification Search
CPC ........ H04W 16/14; H04W 74/08; H04L 5/14; H04L 5/0048; H04L 5/004
See application file for complete search history.

(56) References Cited

U.S. PATENT DOCUMENTS

| | | | |
|---|---|---|---|
| 9,572,063 | B2 | 2/2017 | Etemad et al. |
| 9,641,309 | B2 | 5/2017 | Ko et al. |
| 11,271,625 | B2 | 3/2022 | Park et al. |
| 11,588,585 | B2 | 2/2023 | Shao et al. |
| 11,736,986 | B2 | 8/2023 | Kung et al. |
| 2009/0249153 | A1 | 10/2009 | Zhang |
| 2011/0292843 | A1 | 12/2011 | Gan et al. |
| 2013/0223294 | A1 | 8/2013 | Karjalainen et al. |
| 2015/0304883 | A1 | 10/2015 | Tabet et al. |
| 2016/0105878 | A1 | 4/2016 | Zhao et al. |
| 2016/0242176 | A1 | 8/2016 | Sun et al. |
| 2017/0026942 | A1 | 1/2017 | Vajapeyam et al. |
| 2017/0054544 | A1 | 2/2017 | Kazmi et al. |
| 2017/0289733 | A1 | 10/2017 | Rajagopal et al. |
| 2017/0295594 | A1 | 10/2017 | Ozturk et al. |
| 2018/0007667 | A1 | 1/2018 | You et al. |
| 2018/0098349 | A1 | 4/2018 | Sun et al. |
| 2018/0123710 | A1 | 5/2018 | Kim et al. |
| 2018/0160445 | A1 | 6/2018 | Babaei et al. |
| 2018/0352582 | A1 | 12/2018 | Yi et al. |
| 2019/0075585 | A1 | 3/2019 | Deogun et al. |
| 2019/0104539 | A1 | 4/2019 | Park et al. |
| 2019/0132838 | A1 | 5/2019 | Yi et al. |
| 2019/0335471 | A1 | 10/2019 | Kim et al. |
| 2019/0373588 | A1 | 12/2019 | Bae et al. |
| 2020/0145998 | A1 | 5/2020 | Sun et al. |
| 2020/0154440 | A1 | 5/2020 | Gholmieh et al. |
| 2020/0235980 | A1 | 7/2020 | John Wilson et al. |
| 2020/0245335 | A1 | 7/2020 | Joseph et al. |
| 2020/0296701 | A1 | 9/2020 | Park et al. |
| 2020/0313837 | A1 | 10/2020 | Vejlgaard et al. |
| 2020/0404684 | A1 | 12/2020 | Lee et al. |
| 2021/0058967 | A1* | 2/2021 | Oteri .................... H04W 16/14 |
| 2021/0259000 | A1* | 8/2021 | Khoshnevisan ...... H04L 5/0048 |
| 2021/0321413 | A1 | 10/2021 | Shin et al. |
| 2021/0344455 | A1 | 11/2021 | Choi et al. |
| 2021/0351881 | A1 | 11/2021 | Park et al. |
| 2021/0377926 | A1 | 12/2021 | Li et al. |
| 2022/0022195 | A1 | 1/2022 | Bruun et al. |
| 2022/0039115 | A1 | 2/2022 | Sun et al. |
| 2022/0069884 | A1 | 3/2022 | Zhang et al. |
| 2022/0078728 | A1* | 3/2022 | Yi .......................... H04W 48/16 |
| 2022/0094484 | A1 | 3/2022 | Babaei |
| 2022/0095083 | A1 | 3/2022 | Yeo et al. |
| 2022/0109550 | A1 | 4/2022 | Bai et al. |
| 2022/0109551 | A1 | 4/2022 | Bai et al. |
| 2022/0109553 | A1 | 4/2022 | Bai et al. |
| 2022/0110137 | A1 | 4/2022 | Bai et al. |
| 2022/0124741 | A1 | 4/2022 | Elshafie et al. |
| 2022/0182160 | A1 | 6/2022 | Su et al. |
| 2023/0032475 | A1 | 2/2023 | Bae et al. |
| 2023/0098368 | A1 | 3/2023 | Yu et al. |
| 2023/0148282 | A1 | 5/2023 | Marinier et al. |

FOREIGN PATENT DOCUMENTS

| | | |
|---|---|---|
| WO | WO-2017029292 A1 | 2/2017 |
| WO | WO-2017172165 A1 | 10/2017 |
| WO | WO-2018058455 A1 | 4/2018 |
| WO | WO-2019032882 A1 | 2/2019 |
| WO | WO-2020197645 A1 | 10/2020 |

OTHER PUBLICATIONS

International Search Report and Written Opinion—PCT/US2021/053331—ISA/EPO—Feb. 9, 2022 (208666WO).
Qualcomm Incorporated: "Multi-TRP Enhancements", 3GPP Draft, 3GPP TSG-RAN WG1 Meeting #98, R1-1909272 Multi-TRP Enhancements, 3rd Generation Partnership Project (3GPP), Mobile Competence Centre, 650, Route Des Lucioles, F-06921 Sophia-Antipolis Cedex, France, vol. RAN WG1, No. Prague, Czech Republic, Aug. 26, 2019-Aug. 30, 2019, Aug. 17, 2019 (Aug. 17, 2019), XP051765877, 32 Pages, Retrieved from the Internet: URL: http://www.3gpp.org/ftp/tsg_ran/WG1_RL1/TSGR1_98/Docs/R1-1909272.zip [retrieved on Aug. 17, 2019] PDCCH Related Enhancements, p. 1, Paragraph 3.2, Section 4.1.2, p. 21-p. 23, Figure 12.

* cited by examiner

US 12,328,713 B2

TECHNIQUES FOR SLOT AGGREGATION IN FULL DUPLEX WIRELESS COMMUNICATIONS SYSTEMS

CROSS REFERENCE

The present application for patent claims the benefit of U.S. Provisional Patent Application No. 63/087,779 by BAI et al., entitled "TECHNIQUES FOR SLOT AGGREGATION IN FULL DUPLEX WIRELESS COMMUNICATIONS SYSTEMS," filed Oct. 5, 2020, assigned to the assignee hereof, and expressly incorporated by reference herein.

INTRODUCTION

The following relates to wireless communications, including managing wireless communications in half duplex and full duplex wireless communications systems.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

A method for wireless communications at a UE is described. The method may include receiving an indication, when in a full duplex mode, of a configuration of a set of aggregated slots for the wireless communications, the configuration indicating a first beam pair for the wireless communications during a first subset of aggregated slots of the set of aggregated slots and a second beam pair for the wireless communications during a second subset of aggregated slots of the set of aggregated slots, the second beam pair being different from the first beam pair, and the wireless communications including uplink communications, downlink communications, or a combination thereof, the configuration indicating a first slot aggregation factor associated with the uplink communications and a second slot aggregation factor associated with the downlink communications and communicating the wireless communications using the first beam pair during the first subset of aggregated slots and the second beam pair during the second subset of aggregated slots.

An apparatus for wireless communications at a UE is described. The apparatus may include a processor, memory coupled to the processor, the processor and memory configured to receive, when in a full duplex mode, an indication of a configuration of a set of aggregated slots for the wireless communications, the configuration indicating a first beam pair for the wireless communications during a first subset of aggregated slots of the set of aggregated slots and a second beam pair for the wireless communications during a second subset of aggregated slots of the set of aggregated slots, the second beam pair being different from the first beam pair, and the wireless communications including uplink communications, downlink communications, or a combination thereof, the configuration indicating a first slot aggregation factor associated with the uplink communications and a second slot aggregation factor associated with the downlink communications and communicate the wireless communications using the first beam pair during the first subset of aggregated slots and the second beam pair during the second subset of aggregated slots.

Another apparatus for wireless communications at a UE is described. The apparatus may include means for receiving, when in a full duplex mode, an indication of a configuration of a set of aggregated slots for the wireless communications, the configuration indicating a first beam pair for the wireless communications during a first subset of aggregated slots of the set of aggregated slots and a second beam pair for the wireless communications during a second subset of aggregated slots of the set of aggregated slots, the second beam pair being different from the first beam pair, and the wireless communications including uplink communications, downlink communications, or a combination thereof, the configuration indicating a first slot aggregation factor associated with the uplink communications and a second slot aggregation factor associated with the downlink communications and means for communicating the wireless communications using the first beam pair during the first subset of aggregated slots and the second beam pair during the second subset of aggregated slots.

A non-transitory computer-readable medium storing code for wireless communications at a UE is described. The code may include instructions executable by a processor to receive, when in a full duplex mode, an indication of a configuration of a set of aggregated slots for the wireless communications, the configuration indicating a first beam pair for the wireless communications during a first subset of aggregated slots of the set of aggregated slots and a second beam pair for the wireless communications during a second subset of aggregated slots of the set of aggregated slots, the second beam pair being different from the first beam pair, and the wireless communications including uplink communications, downlink communications, or a combination thereof, the configuration indicating a first slot aggregation factor associated with the uplink communications and a second slot aggregation factor associated with the downlink communications and communicate the wireless communications using the first beam pair during the first subset of aggregated slots and the second beam pair during the second subset of aggregated slots.

In some examples of the method, apparatuses, and non-transitory computer-readable medium described herein, the first slot aggregation factor and the second slot aggregation factor may be based on the configuration, and communicating the wireless communications using the first beam pair during the first subset of aggregated slots may be based on the first slot aggregation factor and communicating the wireless communications using the second beam pair during the second subset of aggregated slots may be based on the second slot aggregation factor.

In some examples of the method, apparatuses, and non-transitory computer-readable medium described herein, the first slot aggregation factor, the second slot aggregation factor, or both, indicates a single repetition, a set of multiple repetitions, or a combination thereof.

Some examples of the method, apparatuses, and non-transitory computer-readable medium described herein may further include operations, features, means, or instructions for selecting a first beam for the uplink communications and a second beam for the downlink communications based on the first subset of aggregated slots of the set of aggregated slots, where communicating the wireless communications includes and communicating the wireless communications using the first beam for the uplink communications and the second beam for the downlink communications during the first subset of aggregated slots.

Some examples of the method, apparatuses, and non-transitory computer-readable medium described herein may further include operations, features, means, or instructions for selecting the second beam for the uplink communications and the first beam for the downlink communications based on the second subset of aggregated slots of the set of aggregated slots, where communicating the wireless communications includes and communicating the wireless communications using the second beam for the uplink communications and the first beam for the downlink communications during the second subset of aggregated slots.

A method for wireless communications at a base station is described. The method may include transmitting, to a UE, an indication of a configuration of a set of aggregated slots for the wireless communications, the configuration indicating a first beam pair for the wireless communications during a first subset of aggregated slots of the set of aggregated slots and a second beam pair for the wireless communications during a second subset of aggregated slots of the set of aggregated slots, the second beam pair being different from the first beam pair, the wireless communications including uplink communications, downlink communications, or a combination thereof, the configuration indicating a first slot aggregation factor associated with the uplink communications and a second slot aggregation factor associated with the downlink communications and communicating the wireless communications using the first beam pair during the first subset of aggregated slots and the second beam pair during the second subset of aggregated slots.

An apparatus for wireless communications at a base station is described. The apparatus may include a processor, memory coupled to the processor, the processor and memory configured to transmit, to a UE, an indication of a configuration of a set of aggregated slots for the wireless communications, the configuration indicating a first beam pair for the wireless communications during a first subset of aggregated slots of the set of aggregated slots and a second beam pair for the wireless communications during a second subset of aggregated slots of the set of aggregated slots, the second beam pair being different from the first beam pair, the wireless communications including uplink communications, downlink communications, or a combination thereof, the configuration indicating a first slot aggregation factor associated with the uplink communications and a second slot aggregation factor associated with the downlink communications and communicate the wireless communications using the first beam pair during the first subset of aggregated slots and the second beam pair during the second subset of aggregated slots.

Another apparatus for wireless communications at a base station is described. The apparatus may include means for transmitting, to a UE, an indication of a configuration of a set of aggregated slots for the wireless communications, the configuration indicating a first beam pair for the wireless communications during a first subset of aggregated slots of the set of aggregated slots and a second beam pair for the wireless communications during a second subset of aggregated slots of the set of aggregated slots, the second beam pair being different from the first beam pair, the wireless communications including uplink communications, downlink communications, or a combination thereof, the configuration indicating a first slot aggregation factor associated with the uplink communications and a second slot aggregation factor associated with the downlink communications and means for communicating the wireless communications using the first beam pair during the first subset of aggregated slots and the second beam pair during the second subset of aggregated slots.

A non-transitory computer-readable medium storing code for wireless communications at a base station is described. The code may include instructions executable by a processor to transmit, to a UE, an indication of a configuration of a set of aggregated slots for the wireless communications, the configuration indicating a first beam pair for the wireless communications during a first subset of aggregated slots of the set of aggregated slots and a second beam pair for the wireless communications during a second subset of aggregated slots of the set of aggregated slots, the second beam pair being different from the first beam pair, the wireless communications including uplink communications, downlink communications, or a combination thereof, the configuration indicating a first slot aggregation factor associated with the uplink communications and a second slot aggregation factor associated with the downlink communications and communicate the wireless communications using the first beam pair during the first subset of aggregated slots and the second beam pair during the second subset of aggregated slots.

A method for wireless communications at a UE operating in a full duplex mode is described. The method may include receiving an indication of a configuration of a set of aggregated slots for the wireless communications, determining a first beam pair for the wireless communications during a first subset of aggregated slots of the set of aggregated slots based at least in part on the configuration, the wireless communications including uplink communications, downlink communications, or both, determining a second beam pair for the wireless communications during a second subset of aggregated slots of the set of aggregated slot based at least in part on the configuration, the second beam pair different from the first beam pair, and communicating the wireless communications using the first beam pair during the first subset of aggregated slots and the second beam pair during the second subset of aggregated slots.

An apparatus for wireless communications operating in a full duplex mode is described. The apparatus may include a processor and memory coupled to the processor, the processor and memory configured to receive an indication of a configuration of a set of aggregated slots for the wireless communications, determine a first beam pair for the wireless communications during a first subset of aggregated slots of the set of aggregated slots based at least in part on the configuration, the wireless communications including uplink communications, downlink communications, or both, determine a second beam pair for the wireless communications during a second subset of aggregated slots of the set of aggregated slot based at least in part on the configuration, the second beam pair different from the first beam pair, and communicate the wireless communications using the first beam pair during the first subset of aggregated slots and the second beam pair during the second subset of aggregated slots.

Another apparatus for wireless communications operating in a full duplex mode is described. The apparatus may include means for receiving an indication of a configuration of a set of aggregated slots for the wireless communications, means for determining a first beam pair for the wireless communications during a first subset of aggregated slots of the set of aggregated slots based at least in part on the configuration, the wireless communications including uplink communications, downlink communications, or both, means for determining a second beam pair for the wireless communications during a second subset of aggregated slots of the set of aggregated slot based at least in part on the configuration, the second beam pair different from the first beam pair, and means for communicating the wireless communications using the first beam pair during the first subset of aggregated slots and the second beam pair during the second subset of aggregated slots.

A non-transitory computer-readable medium storing code for wireless communications at a UE operating in a full duplex mode is described. The code may include instructions executable by a processor to receive an indication of a configuration of a set of aggregated slots for the wireless communications, determine a first beam pair for the wireless communications during a first subset of aggregated slots of the set of aggregated slots based at least in part on the configuration, the wireless communications including uplink communications, downlink communications, or both, determine a second beam pair for the wireless communications during a second subset of aggregated slots of the set of aggregated slot based at least in part on the configuration, the second beam pair different from the first beam pair, and communicate the wireless communications using the first beam pair during the first subset of aggregated slots and the second beam pair during the second subset of aggregated slots.

Some examples of the method, apparatuses, and non-transitory computer-readable medium described herein may further include operations, features, means, or instructions for selecting a first beam for the uplink communications and a second beam for the downlink communications based at least in part on the first subset of aggregated slots of the set of aggregated slots. In some examples of the method, apparatuses, and non-transitory computer-readable medium described herein, communicating the wireless communications includes communicating the wireless communications using the first beam for the uplink communications and the second beam for the downlink communications during the first subset of aggregated slots.

Some examples of the method, apparatuses, and non-transitory computer-readable medium described herein may further include operations, features, means, or instructions for selecting the second beam for the uplink communications and the first beam for the downlink communications based at least in part on the second subset of aggregated slots of the set of aggregated slots. In some examples of the method, apparatuses, and non-transitory computer-readable medium described herein, communicating the wireless communications includes communicating the wireless communications using the second beam for the uplink communications and the first beam for the downlink communications during the second subset of aggregated slots.

Some examples of the method, apparatuses, and non-transitory computer-readable medium described herein may further include operations, features, means, or instructions for determining a slot aggregation factor based at least in part on the configuration. In some examples of the method, apparatuses, and non-transitory computer-readable medium described herein, communicating the wireless communications using the first beam pair during the first subset of aggregated slots and the second beam pair during the second subset of aggregated slots may be based at least in part on the determined slot aggregation factor.

Some examples of the method, apparatuses, and non-transitory computer-readable medium described herein may further include operations, features, means, or instructions for determining a first slot aggregation factor associated with the uplink communications and a second slot aggregation factor associated with the downlink communications.

In some examples of the method, apparatuses, and non-transitory computer-readable medium described herein, the configuration indicates the first slot aggregation factor, the second slot aggregation factor, or both.

In some examples of the method, apparatuses, and non-transitory computer-readable medium described herein, the first slot aggregation factor, the second slot aggregation factor, or both indicates a single repetition, a plurality of repetitions, or a combination thereof.

Some examples of the method, apparatuses, and non-transitory computer-readable medium described herein may further include operations, features, means, or instructions for determining a beam order associated with the set of aggregated slots based at least in part on the configuration. In some examples of the method, apparatuses, and non-transitory computer-readable medium described herein, communicating the wireless communications using the first beam pair during the first subset of aggregated slots and the second beam pair during the second subset of aggregated slots may be based at least in part on the determined beam order.

Some examples of the method, apparatuses, and non-transitory computer-readable medium described herein may further include operations, features, means, or instructions for receiving a radio resource control (RRC) message, a medium access control-control element (MAC-CE) message, or a downlink control information (DCI) message, or a combination thereof, including the indication of the configuration of the set of aggregated slots for the uplink communications, the downlink communications, or both. In some examples of the method, apparatuses, and non-transitory computer-readable medium described herein, communicating the wireless communications using the first beam pair during the first subset of aggregated slots and the second beam pair during the second subset of aggregated slots may be based at least in part on the received RRC message, the MAC-CE message, or the DCI message, or a combination thereof.

In some examples of the method, apparatuses, and non-transitory computer-readable medium described herein, the first subset of aggregated slots may be different from the second subset of aggregated slots.

In some examples of the method, apparatuses, and non-transitory computer-readable medium described herein, the second beam pair includes an inverse of the first beam pair.

In some examples of the method, apparatuses, and non-transitory computer-readable medium described herein, each slot of the first subset of aggregated slots alternates with each slot of the second subset of aggregated slots.

In some examples of the method, apparatuses, and non-transitory computer-readable medium described herein, the first subset of aggregated slots, or the second subset of aggregated slots, or both, include one or more groups of slots.

Some examples of the method, apparatuses, and non-transitory computer-readable medium described herein may further include operations, features, means, or instructions for transmitting, during the first subset of aggregated slots, the uplink communications using a first beam and receiving, during the first subset of aggregated slots, the downlink communications using a second beam.

Some examples of the method, apparatuses, and non-transitory computer-readable medium described herein may further include operations, features, means, or instructions for transmitting, during the second subset of aggregated slots, the uplink communications using the second beam or a third beam and receiving, during the second subset of aggregated slots, the downlink communications using the first beam or a fourth beam.

A method for wireless communications at a base station is described. The method may include transmitting, to a UE, an indication of a configuration of a set of aggregated slots for the wireless communications when the UE is operating in a full duplex mode, determining a first beam pair for the wireless communications during a first subset of aggregated slots of the set of aggregated slots, the wireless communications including uplink communications, downlink communications, or both, determining a second beam pair for the wireless communications during a second subset of aggregated slots of the set of aggregated slot, the second beam pair different from the first beam pair, and communicating the wireless communications using the first beam pair during the first subset of aggregated slots and the second beam pair during the second subset of aggregated slots.

An apparatus for wireless communications is described. The apparatus may include a processor and memory coupled to the processor, the processor and memory configured to transmit, to a UE, an indication of a configuration of a set of aggregated slots for the wireless communications when the UE is operating in a full duplex mode, determine a first beam pair for the wireless communications during a first subset of aggregated slots of the set of aggregated slots, the wireless communications including uplink communications, downlink communications, or both, determine a second beam pair for the wireless communications during a second subset of aggregated slots of the set of aggregated slot, the second beam pair different from the first beam pair, and communicate the wireless communications using the first beam pair during the first subset of aggregated slots and the second beam pair during the second subset of aggregated slots.

Another apparatus for wireless communications is described. The apparatus may include means for transmitting, to a UE, an indication of a configuration of a set of aggregated slots for the wireless communications when the UE is operating in a full duplex mode, means for determining a first beam pair for the wireless communications during a first subset of aggregated slots of the set of aggregated slots, the wireless communications including uplink communications, downlink communications, or both, means for determining a second beam pair for the wireless communications during a second subset of aggregated slots of the set of aggregated slot, the second beam pair different from the first beam pair, and means for communicating the wireless communications using the first beam pair during the first subset of aggregated slots and the second beam pair during the second subset of aggregated slots.

A non-transitory computer-readable medium storing code for wireless communications at a base station is described. The code may include instructions executable by a processor to transmit, to a UE, an indication of a configuration of a set of aggregated slots for the wireless communications when the UE is operating in a full duplex mode, determine a first beam pair for the wireless communications during a first subset of aggregated slots of the set of aggregated slots, the wireless communications including uplink communications, downlink communications, or both, determine a second beam pair for the wireless communications during a second subset of aggregated slots of the set of aggregated slot, the second beam pair different from the first beam pair, and communicate the wireless communications using the first beam pair during the first subset of aggregated slots and the second beam pair during the second subset of aggregated slots.

Some examples of the method, apparatuses, and non-transitory computer-readable medium described herein may further include operations, features, means, or instructions for selecting a first beam for the uplink communications and a second beam for the downlink communications based at least in part on the first subset of aggregated slots of the set of aggregated slots. In some examples of the method, apparatuses, and non-transitory computer-readable medium described herein, communicating the wireless communications includes communicating the wireless communications using the first beam for the uplink communications and the second beam for the downlink communications during the first subset of aggregated slots.

Some examples of the method, apparatuses, and non-transitory computer-readable medium described herein may further include operations, features, means, or instructions for selecting the second beam for the uplink communications and the first beam for the downlink communications based at least in part on the second subset of aggregated slots of the set of aggregated slots. In some examples of the method, apparatuses, and non-transitory computer-readable medium described herein, communicating the wireless communications includes communicating the wireless communications using the second beam for the uplink communications and the first beam for the downlink communications during the second subset of aggregated slots.

Some examples of the method, apparatuses, and non-transitory computer-readable medium described herein may further include operations, features, means, or instructions for determining a slot aggregation factor. In some examples of the method, apparatuses, and non-transitory computer-readable medium described herein, communicating the wireless communications using the first beam pair during the first subset of aggregated slots and the second beam pair during the second subset of aggregated slots may be based at least in part on the determined slot aggregation factor.

Some examples of the method, apparatuses, and non-transitory computer-readable medium described herein may further include operations, features, means, or instructions for determining a first slot aggregation factor associated with the uplink communications and a second slot aggregation factor associated with the downlink communications.

In some examples of the method, apparatuses, and non-transitory computer-readable medium described herein, the configuration indicates the first slot aggregation factor, the second slot aggregation factor, or both.

In some examples of the method, apparatuses, and non-transitory computer-readable medium described herein, the first slot aggregation factor, the second slot aggregation factor, or both indicates a single repetition, a plurality of repetitions, or a combination thereof.

Some examples of the method, apparatuses, and non-transitory computer-readable medium described herein may further include operations, features, means, or instructions for determining a beam order associated with the set of aggregated slots based at least in part on the configuration. In some examples of the method, apparatuses, and non-transitory computer-readable medium described herein, communicating the wireless communications using the first beam pair during the first subset of aggregated slots and the second beam pair during the second subset of aggregated slots may be based at least in part on the determined beam order.

Some examples of the method, apparatuses, and non-transitory computer-readable medium described herein may further include operations, features, means, or instructions for transmitting a RRC message, a MAC-CE message, or a DCI message, or a combination thereof, including the indication of the configuration of the set of aggregated slots for the uplink communications, the downlink communications, or both. In some examples of the method, apparatuses, and non-transitory computer-readable medium described herein, communicating the wireless communications using the first beam pair during the first subset of aggregated slots and the second beam pair during the second subset of aggregated slots may be based at least in part on the transmitted RRC message, the MAC-CE message, or the DCI message, or a combination thereof.

In some examples of the method, apparatuses, and non-transitory computer-readable medium described herein, the first subset of aggregated slots may be different from the second subset of aggregated slots.

In some examples of the method, apparatuses, and non-transitory computer-readable medium described herein, the second beam pair includes an inverse of the first beam pair.

In some examples of the method, apparatuses, and non-transitory computer-readable medium described herein, each slot of the first subset of aggregated slots alternates with each slot of the second subset of aggregated slots.

In some examples of the method, apparatuses, and non-transitory computer-readable medium described herein, the first subset of aggregated slots, or the second subset of aggregated slots, or both, include one or more groups of slots.

Some examples of the method, apparatuses, and non-transitory computer-readable medium described herein may further include operations, features, means, or instructions for receiving, during the first subset of aggregated slots, the uplink communications using a first beam and transmitting, during the first subset of aggregated slots, the downlink communications using a second beam.

Some examples of the method, apparatuses, and non-transitory computer-readable medium described herein may further include operations, features, means, or instructions for receiving, during the second subset of aggregated slots, the uplink communications using the second beam or a third beam and transmitting, during the second subset of aggregated slots, the downlink communications using the first beam or a fourth beam.

DETAILED DESCRIPTION

Figure 1:
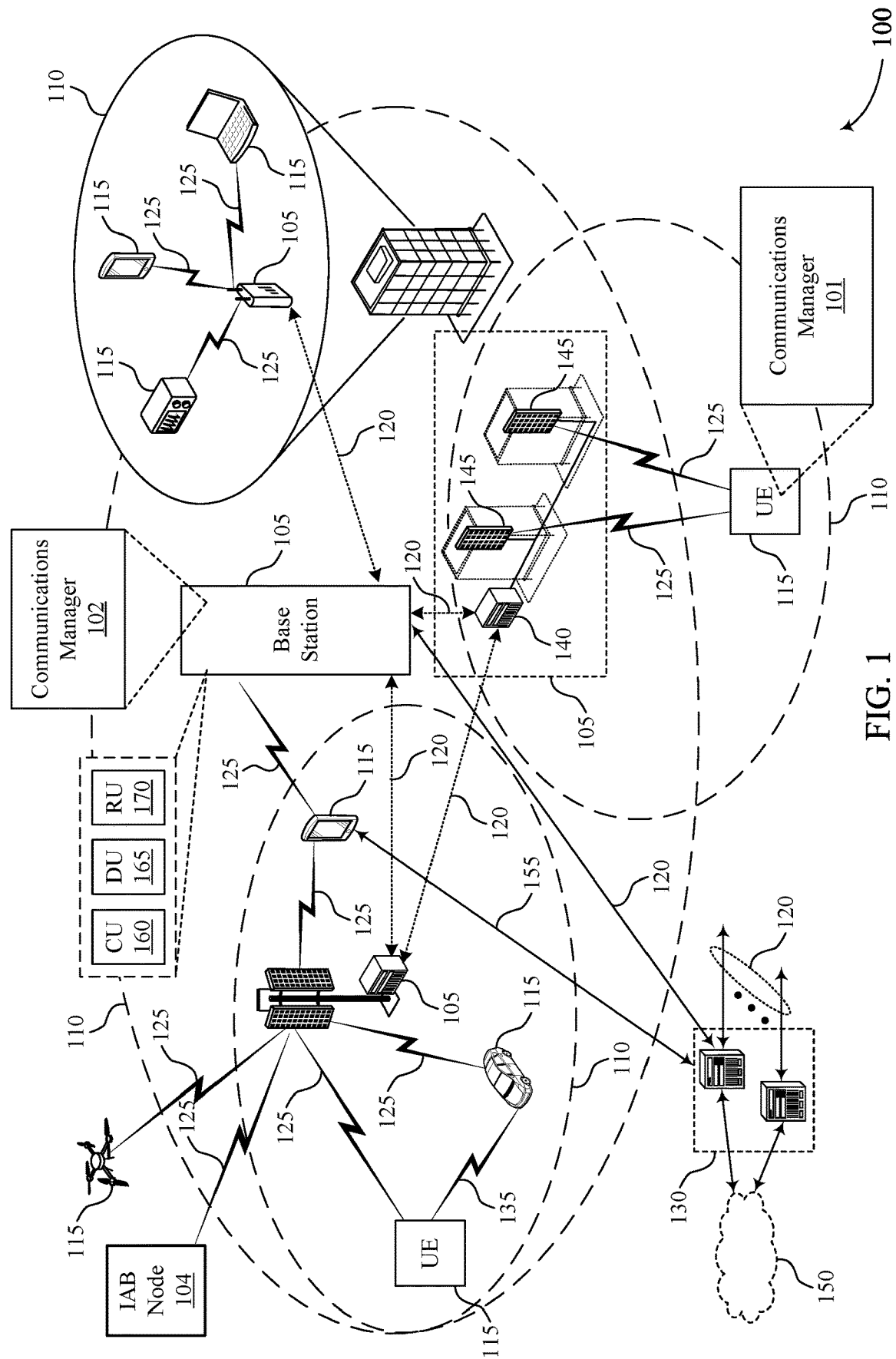
FIGS. 1 through 3 illustrate examples of wireless communication systems for wireless communications that supports techniques for slot aggregation in full duplex wireless communications systems in accordance with one or more aspects of the present disclosure.

Some wireless communications may support communications between devices, such as a user equipment (UE) and a base station (e.g., an eNodeB (eNB), a next-generation NodeB or a giga-NodeB, either of which may be referred to as a gNB, or some other base station). Such devices may operate in a half-duplex mode, a full-duplex mode, or a combination thereof. For example, a UE operating in a half-duplex mode may either transmit uplink communications or receive downlink communications during a transmission time interval (TTI). In the full-duplex mode, the UE may simultaneously transmit uplink communications and receive downlink communications during the TTI. A TTI may span one or more time resources (e.g., symbols, mini-slots, slot, etc.). Such a full duplex mode may result in relatively efficient communications (e.g., higher spectrum efficiency, reduced latency, etc.).

As used herein, the term "full-duplex" may refer to a mode that supports two-way communication via simultaneous transmission and reception. A communication device (e.g., a base station, a UE, etc.) may be configured with multiple antennas, which may be used to transmit and receive communications while operating in a full-duplex mode. In some cases, the communication device may be configured with multiple antennas panels for uplink communications and downlink communications. In some cases, the communication device may experience self-interference as a result of using the multiple antenna panels for the uplink communication and the downlink communications (e.g., in a full-duplex mode) at a same time. In some cases, the self-interference may occur due to signal leakage between a transmit antenna and a receive antenna.

In accordance with the techniques described herein, a wireless communications system may implement slot aggregation and beam selection techniques for devices operating in a full duplex mode, which may reduce interference, improve communications reliability or efficiency, or a combination thereof. For example, a base station may communicate with a UE having the capability of full duplex communications (e.g., the UE may receive downlink communications and transmit uplink communications, for example, simultaneously). The UE may be configured with slot aggregation for such communications. For example, the base station may transmit, to the UE, an indication of a set of aggregated slots for uplink communications, downlink communications, or both (e.g., the uplink communications may be associated with a set of aggregated slots and the downlink communications may be associated with another set of aggregated slots that may overlap with the first set). The set of aggregated slots may indicate a quantity of slots that a same payload may be repeated in consecutive slots or mini-slots. As used herein, the term "indication" may refer to information included in control signaling, such as a DCI or other control information. In some cases, an indication may indicate a configuration. As used herein, term "configuration" may refer to an order or a technique for implementing slot aggregation, an order or a technique for implementing one or more beams, or an additional order or technique associated with wireless communications.

A device may determine a first beam pair for the communications during a first subset of the aggregated slots. For example, the device may select a first beam for uplink communications and a second beam for downlink communications when communicating in the first subset of slots. Additionally or alternatively, the device may determine a second beam pair for the communications during a second subset of the aggregated slots. For example, the device may select a different beam for the uplink communications and a different beam for the downlink communications when communicating in the second subset of slots. In some examples, the second beam pair may be an inverse of the first beam pair. As used herein, the term "inverse" may refer to an opposite, such as an inverse or opposite beam. In some cases, an "inverse beam" may refer to a beam where one or more parameters associated with the beam may be selected to mitigate interference with other beams. For example, a frequency, an angle, a phase and/or a polarization of a beam may be selected to decrease or eliminate interference with another beam. In some cases, the device may select the first beam for downlink communications and the second beam (e.g., an inverse of the first beam) for uplink communications during the second subset of slots to minimize or reduce self-interference between the beams. In some examples, the device may alternate between the beam pairs for each TTI (e.g., each slot or mini-slot, or each group of slots). As used herein, the term "mini-slot" may refer to a time unit. For example, a slot may be divided into multiple mini-slots.

The communication devices may experience efficient full duplex communications by supporting slot aggregation in full duplex communications. In some examples, the techniques may enable communication devices to implement slot aggregation and beam switching operations for uplink communications, downlink communications, or both, which may result in improved power consumption, improved spectral efficiency, reduced latency, higher reliability, reduced interference or any combination thereof, among other examples. As used herein, the phrase "beam switching operations" may refer to a process or a method where a base station or a UE change a beam from a first beam to a second beam.

Aspects of the disclosure are initially described in the context of wireless communications systems. Aspects of the disclosure are then described with reference to resource schemes and process flows. Aspects of the disclosure are further illustrated by and described with reference to apparatus diagrams, system diagrams, and flowcharts that relate to techniques for slot aggregation in full duplex wireless communications systems.

FIG. 1 illustrates an example of a wireless communications system 100 that supports techniques for slot aggregation in full duplex wireless communications systems in accordance with one or more aspects of the present disclosure. The wireless communications system 100 may include one or more base stations 105, one or more UEs 115, and a core network 130. In some examples, the wireless communications system 100 may be an LTE network, an LTE-Advanced (LTE-A) network, an LTE-A Pro network, or a NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. A UE 115 may communicate with the core network 130 through a communication link 155. One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation. A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception simultaneously). As described herein simultaneous wireless communication by a base station 105, or a UE 115, or both, may include uplink transmission, uplink reception, downlink transmission, or downlink reception, or a combination thereof, that occurs at the same time (e.g., a symbol period, a mini-slot, a slot, etc.). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guardband of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). The region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Techniques described herein, in addition to or as an alternative to be carried out between UEs 115 and base stations 105, may be implemented via additional or alternative wireless devices, including IAB nodes 104, distributed units (DUs) 165, centralized units (CUs) 160, radio units (RUs) 170, and the like. For example, in some implementations, aspects described herein may be implemented in the context of a disaggregated radio access network (RAN) architecture (e.g., open RAN architecture). In a disaggregated architecture, the RAN may be split into three areas of functionality corresponding to the CU 160, the DU 165, and the RU 170. The split of functionality between the CU 160, DU 165, and RU 170 is flexible and as such gives rise to numerous permutations of different functionalities depending upon which functions (e.g., MAC functions, baseband functions, radio frequency functions, and any combinations thereof) are performed at the CU 160, DU 165, and RU 170. For example, a functional split of the protocol stack may be employed between a DU 165 and an RU 170 such that the DU 165 may support one or more layers of the protocol stack and the RU 170 may support one or more different layers of the protocol stack.

Some wireless communications systems (e.g., wireless communications system 100), infrastructure and spectral resources for NR access may additionally support wireless backhaul link capabilities in supplement to wireline backhaul connections, providing an IAB network architecture. One or more base stations 105 may include CUs 160, DUs 165, and RUs 170 and may be referred to as donor base stations 105 or IAB donors. One or more DUs 165 (e.g., and/or RUs 170) associated with a donor base station 105 may be partially controlled by CUs 160 associated with the donor base station 105. The one or more donor base stations 105 (e.g., IAB donors) may be in communication with one or more additional base stations 105 (e.g., IAB nodes 104) via supported access and backhaul links. IAB nodes 104 may support mobile terminal (MT) functionality controlled and/or scheduled by DUs 165 of a coupled IAB donor. In addition, the IAB nodes 104 may include DUs 165 that support communication links with additional entities (e.g., IAB nodes 104, UEs 115, etc.) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In some examples, the wireless communications system 100 may include a core network 130 (e.g., a next generation core network (NGC)), one or more IAB donors, IAB nodes 104, and UEs 115, where IAB nodes 104 may be partially controlled by each other and/or the IAB donor. The IAB donor and IAB nodes 104 may be examples of aspects of base stations 105. IAB donor and one or more IAB nodes 104 may be configured as (e.g., or in communication according to) some relay chain.

For instance, an access network (AN) or RAN may refer to communications between access nodes (e.g., IAB donor), IAB nodes 104, and one or more UEs 115. The IAB donor may facilitate connection between the core network 130 and the AN (e.g., via a wireline or wireless connection to the core network 130). That is, an IAB donor may refer to a RAN node with a wireline or wireless connection to core network 130. The IAB donor may include a CU 160 and at least one DU 165 (e.g., and RU 170), where the CU 160 may communicate with the core network 130 over an NG interface (e.g., some backhaul link). The CU 160 may host layer 3 (L3) (e.g., RRC, service data adaption protocol (SDAP), PDCP, etc.) functionality and signaling. The at least one DU 165 and/or RU 170 may host lower layer, such as layer 1 (L1) and layer 2 (L2) (e.g., RLC, MAC, physical (PHY), etc.) functionality and signaling, and may each be at least partially controlled by the CU 160. The DU 165 may support one or multiple different cells. IAB donor and IAB nodes 104 may communicate over an F1 interface according to some protocol that defines signaling messages (e.g., F1 AP protocol). Additionally, CU 160 may communicate with the core network over an NG interface (which may be an example of a portion of backhaul link), and may communicate with other CUs 160 (e.g., a CU 160 associated with an alternative IAB donor) over an Xn-C interface (which may be an example of a portion of a backhaul link).

IAB nodes 104 may refer to a RAN node that provides IAB functionality (e.g., access for UEs 115, wireless self-backhauling capabilities, etc.). IAB nodes 104 may include a DU 165 and an MT. A DU 165 may act as a distributed scheduling node towards child nodes associated with the IAB node 104, and the MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, an IAB node 104 may also be referred to as a parent node or a child node to other IAB nodes 104, depending on the relay chain or configuration of the AN. Therefore, the MT entity of IAB nodes 104 (e.g., MTs) may provide a Uu interface for a child node to receive signaling from a parent IAB node 104, and the DU interface (e.g., DUs 165) may provide a Uu interface for a parent node to signal to a child IAB node 104 or UE 115.

For example, IAB node 104 may be referred to a parent node associated with IAB node, and a child node associated with IAB donor. The IAB donor may include a CU 160 with a wireline (e.g., optical fiber) or wireless connection to the core network, and may act as parent node to IAB nodes 104. For example, the DU 165 of IAB donor may relay transmissions to UEs 115 through IAB nodes 104, and may directly signal transmissions to a UE 115. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling over an NR Uu interface to MT of the IAB node 104. Communications with IAB node 104 may be scheduled by DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture (e.g., one or more IAB nodes 104 or components of IAB nodes 104) may be configured to support techniques for slot aggregation in full duplex wireless communications as described herein. For example, some operations described as being performed by a UE 115 or a base station 105 may additionally or alternatively be performed by components of the disaggregated RAN architecture (e.g., IAB nodes, DUs, CUs, etc.).

In some cases, one or more UEs 115 configured to operate with one or more components of a disaggregated RAN architecture may be referred to as disaggregated UEs. The disaggregated UEs may be configured to support techniques for slot aggregation in full duplex wireless communications as described herein. In some cases, the disaggregated UEs may communicate with one or more donor base stations 105 or IAB donors. In addition, the IAB nodes 104 may include DUs 165 that support communication links with additional entities (e.g., IAB nodes 104, disaggregated UEs, etc.) within the relay chain or configuration of the access network (e.g., downstream). In such cases, one or more disaggregated UEs within the disaggregated RAN architecture may be configured to operate according to the techniques described herein.

In the wireless communications system 100 a UE 115 and a base station 105 (e.g., an eNodeB (eNB), a next-generation NodeB or a giga-NodeB, either of which may be referred to as a gNB, or some other base station), may support wireless communications over one or multiple radio access technologies. Examples of radio access technologies include 4G systems, such as LTE systems, and 5G systems, which may be referred to as NR systems. The base station 105 and the UE 115 may operate in a half duplex mode or a full duplex mode, or a combination thereof. The wireless communications system 100 may be configured to support techniques for slot aggregation, beam selection, or both for full duplex mode operations. For example, a base station 105 may communicate with a UE 115 capable of full duplex communications (e.g., the UE 115 may receive downlink communications and transmit uplink communications, for example, simultaneously). The UE 115 may include a communications manager 101 that enables such techniques, the base station 105 may include a communications manager 102 that enables such techniques, or both. For example, a device may determine, via the communications manager 101 or the communications manager 102, a first beam pair for the communications during a first subset of aggregated slots, determine a second beam pair for the communications during a second subset of the aggregated slots, and communicate using the determined beam pairs during the aggregated slots. Such techniques may result in reduced interference, improved communications reliability or efficiency, or a combination thereof.

Figure 2:
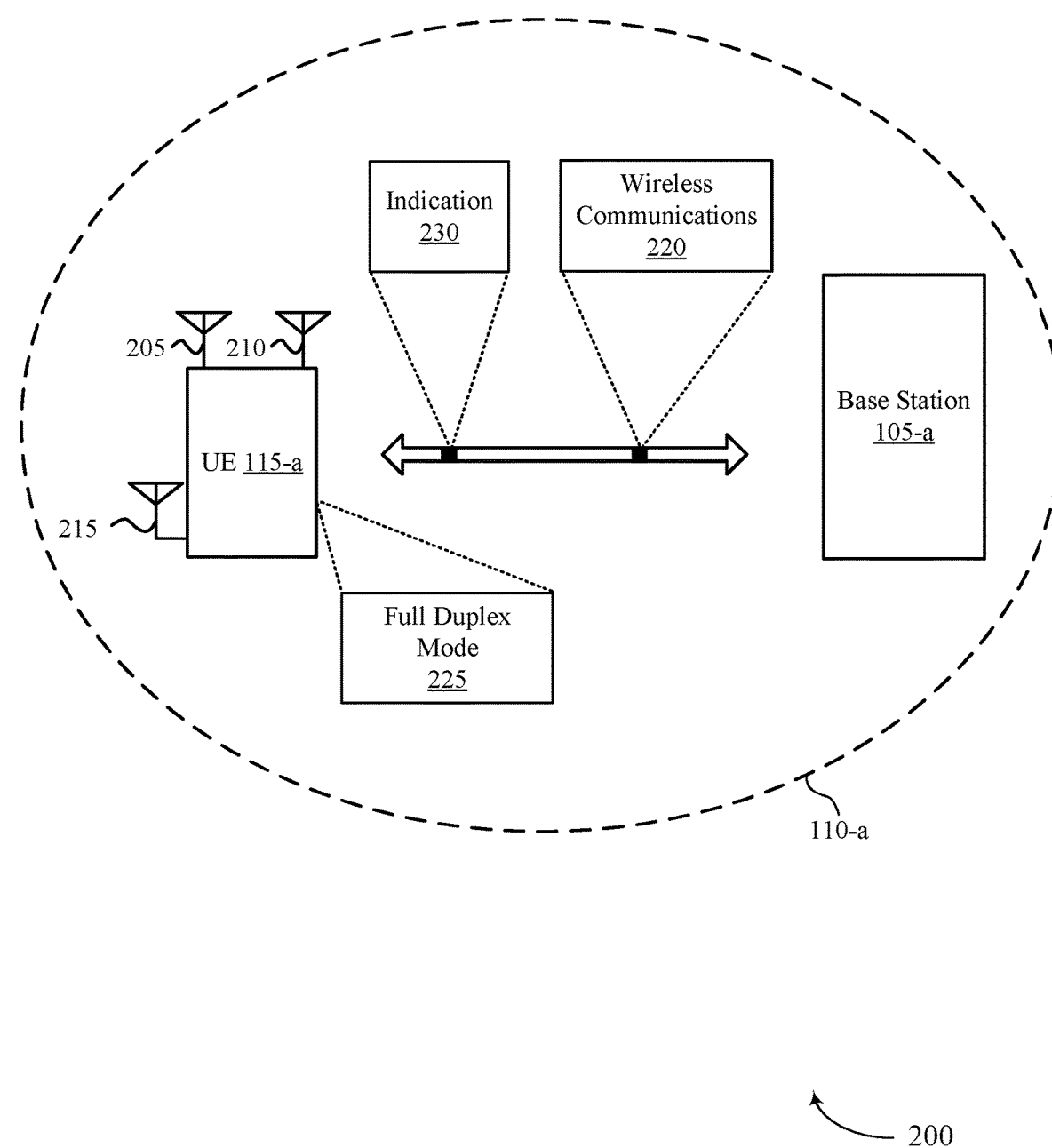

FIG. 2 illustrates an example of a wireless communications system 200 that supports techniques for slot aggregation in full duplex wireless communications systems in accordance with one or more aspects of the present disclosure. The wireless communications system 200 may implement aspects of wireless communications system 100. For example, the wireless communications system 200 may include a base station 105-*a* and a UE 115-*a*, which may be examples of a base station 105 and a UE 115 as described herein.

The base station 105-*a* and the UE 115-*a* may be configured with multiple antennas, which may be used to employ techniques such as transmit diversity, receive diversity, multiple-input multiple-output communications, or beamforming, or any combination thereof. The antennas of the base station 105-*a* and the UE 115-*a* may be located within one or more antenna arrays or antenna panels, which may support multiple-input multiple-output operations or transmit or receive beamforming. For example, the base station 105-*a* antennas or antenna arrays may be co-located at an antenna assembly, such as an antenna tower. In some examples, antennas or antenna arrays associated with the base station 105-*a* may be located in diverse geographic locations. The base station 105-*a* may have an antenna array with a number of rows and columns of antenna ports that the base station 105-*a* may use to support beamforming of communications with the UE 115-*a*. Likewise, the UE 115-*a* may have one or more antenna arrays that may support various multiple-input multiple-output or beamforming operations. Additionally or alternatively, an antenna panel may support radio frequency beamforming for a signal transmitted via one or more antenna ports. The base station 105-*a* and the UE 115-*a* may thus be configured to support directional communications (e.g., beamformed communications) using the multiple antennas.

The base station 105-*a* or the UE 115-*a*, or both may operate in a half duplex mode or a full duplex mode 225, or a combination thereof. For example, in a half duplex mode, the UE 115-*a* may either transmit uplink communications or receive downlink communications during one or more TTIs. In the full duplex mode 225, the UE 115-*a* may simultaneously transmit uplink communications and receive downlink communications during the one or more TTIs. A TTI may span one or more time resources (e.g., symbols, mini-slots, slot, etc.) and one or more frequency resources (e.g., sub-carriers, carriers, etc.). In the full duplex mode 225, the wireless communications 220 may use different tones or the same tones. For example, transmission and reception in full duplex mode 225 may use different BWPs to reduce self-interference.

In the example of FIG. 2, when the base station 105-*a* and the UE 115-*a* are configured with multiple antenna panels, where one antenna panel may be dedicated for downlink communications and another antenna panel may be dedicated for uplink communications, the base station 105-*a* or the UE 115-*a* may experience self-interference. The self-interference may be a result of simultaneously using multiple antenna panels for uplink communications and downlink communications (e.g., in full duplex communications). In some examples, the self-interference may occur due to signal leakage between a transmit antenna 205 and a receive antenna 210. In some other examples, the self-interference may occur due to signal leakage between a transmit antenna 215 and the receive antenna 210, but this self-interference may be less compared to the self-interference between the transmit antenna 205 and the receive antenna 210. The base station 105-*a*, the UE 115-*a*, or both, may manage (e.g., reduce or eliminate) self-interference at the base station 105-*a*, the UE 115-*a*, or both, by implementing beam selection techniques (e.g., beam switching techniques), slot aggregation, or a combination thereof (e.g., when the base station 105-*a*, the UE 115-*a*, or both, are operating in a full duplex mode 225).

The base station 105-*a* and the UE 115-*a* may implement slot aggregation for the wireless communications 220. For example, the base station 105-*a* may indicate via indication 230 that slot aggregation is to be implemented for uplink communications, downlink communications, or both (e.g., the base station 105-*a* may indicate via indication 230 a set of aggregated slots or indicate that a transmission will be retransmitted via a set of aggregated slots to the UE 115-*a* via an indication 230, which may include control signaling). In such examples, a same payload may be repeated in consecutive aggregated TTIs (e.g., consecutive slots or mini-slots). For instance, a payload for downlink communications may be retransmitted in each slot of a set of aggregated slots, a payload for uplink communications may be retransmitted in each slot of a second set of aggregated slots, or a combination thereof (e.g., the set of aggregated slots and the second set of aggregated slots may overlap). A receiver device (e.g., the UE 115-*a* for downlink communications, the base station 105-*a* for uplink communications) may soft combine such aggregated slots to boost a processing signal-to-noise ratio (SNR), which may improve communications. In some examples, such slot aggregation may be used for physical uplink shared channel data, physical downlink shared channel data, or both, among other examples of data and channels.

The aggregated slots may use different spatial beams for the wireless communications 220 (e.g., mmW communications). For example, if the same content (e.g., a similar payload) is repeated in each of three slots, different beam pair links may be used for the set of three aggregated slots. By using different spatial beams (e.g., different spatial beams may come from different transmission reception points (TRPs), such as via antennas 205, 210, 215, etc.), the system may realize improved diversity against blockages in mmW bands and reduced delay for feedback (e.g., a relatively short delay than HARQ).

The techniques described herein may enable a UE 115-*a* and a base station 105-*a* to efficiently select uplink and downlink beams (e.g., uplink/downlink beam pairs) for wireless communications 220 (e.g., full duplex communications), which may reduce self-interference, among other enhancements. For example, the devices may perform a beam training process (e.g., using simultaneous channel state information reference signal (CSI-RS) or sounding reference signal (SRS) sweeping procedures, among other examples) and the devices may select beam pairs that result in relatively low interference, high SNR, or both, among other examples of selecting beam pairs based on metrics obtained from a beam training process. In some examples, a device may choose a transmission beam or a reception beam or both from different antenna panels, different spatial directions, etc. Accordingly, in a full duplex setup, the base station 105-*a* and the UE 115-*a* may use two beam pair links for uplink and downlink communications (e.g., balancing pathloss and self-interference). For example, the base station 105-*a* may use a selected transmission beam for sending downlink communications and a reception beam for receiving uplink communications, and the UE 115-*a* may use a selected transmission beam for sending uplink communications and a reception beam for receiving downlink communications.

The devices may switch beam pairs for one or more slots of a set of aggregated slots. For example, a device may determine a first beam pair (e.g., an uplink beam and a downlink beam for full duplex communications) for a first subset of the set of aggregated slots and a second beam pair for a second subset of the aggregated slots, although any quantity of beam pairs and subsets of the aggregated slots may be used. The base station 105-*a* and the UE 115-*a* may determine a beam order for a set of aggregated slots (e.g., a first beam pair to use for a first subset of slots, a second beam pair to use for a second subset of slots, etc.). In some examples, the base station 105-*a* may configure the UE 115-*a* with the beam order (e.g., via indication 230, which may indicate the beams to use in each slot), or the UE 115-*a* may be pre-configured to identify beams to use based on predefined rules (e.g., the UE 115-*a* may swap uplink and downlink beams in consecutive aggregated slots when slot aggregation is enabled, among other examples as described herein).

Figure 3:
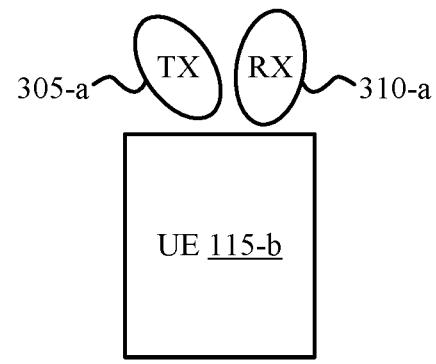
Figure 3:
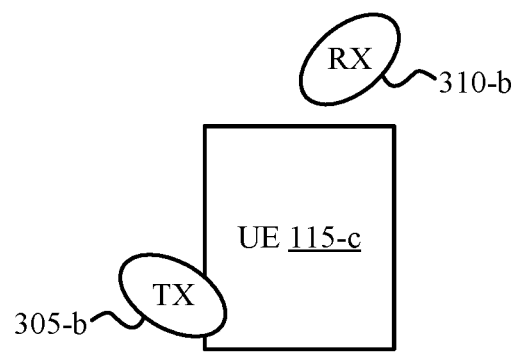

FIG. 3 illustrates an example of a wireless communications system 300 that supports techniques for slot aggregation in full duplex wireless communications systems in accordance with one or more aspects of the present disclosure. In some examples, the wireless communications system 300 may implement aspects of wireless communications systems 100, 200, or both. For example, the wireless communications system 300 may include a UE 115-b and a UE 115-c, which may be examples of a UE 115 or another device as described with reference to FIGS. 1 and 2.

The wireless communications system 300 may illustrate example configurations for beam pair selection. For example, the UEs 115 may include transmission and reception antennas/RF chains. The UE 115-b may implement a transmission beam 305-a and a reception beam 310-a for full duplex operations. In other words, the transmission beam 305-a and the reception beam 310-a may be an example of a beam pair for full duplex communications, the transmission beam 305-b and the reception beam 310-b may be another example of a beam pair, etc. In some examples, the UE 115-b may experience self-interference, for example, from the transmission antenna (e.g., associated with the transmission beam 305-a) to the reception chain (e.g., associated with the reception beam 310-a). Such self-interference may be the result of proximity or reflection from the environment (e.g., local clutter), among other examples. In some cases, the self-interference at the reception beam 310-a from the transmission beam 305-a may be relatively strong (e.g., as strong as another reception signal with cancellation techniques, such as analog cancellation, digital cancellation, etc.).

Accordingly, the techniques described herein may enable devices (e.g., UEs 115 or base stations 105) to efficiently select beams for full duplex operations. For example, the UE 115-c may implement self-interference mitigation techniques to select the reception beam 310-b and the transmission beam 305-b for full duplex communications. The UE 115-c may select the beams based on beam training procedures, as described with reference to FIG. 2. By selecting the reception beam 310-b and the transmission beam 305-b, the UE 115-c may realize reduced self-interference (e.g., due to the spatial diversity compared to the transmission beam 305-a and the reception beam 310-a).

In some examples, the UE 115-c may implement slot aggregation as described with reference to FIG. 2. For example, a base station may indicate a set of aggregated slots via control signaling. Such control signaling may include an RRC message, a medium access control-control element (MAC-CE) message, or a downlink control information (DCI) message, or any combination thereof. The control signaling may indicate slot aggregation for uplink communications, downlink communications, or both. In some cases, the control signaling may indicate a factor of slot aggregation (e.g., the slot aggregation factor K may represent the quantity of retransmissions of a transport block, a quantity of slots for the retransmissions, or both). In some examples, the UE 115-c may determine a first slot aggregation factor associated with uplink communications and a second slot aggregation factor associated with downlink communications (e.g., the uplink communications may be associated with a first quantity of repetitions and the downlink communications may be associated with a second quantity of repetitions). In some cases, the first slot aggregation factor is the same as the second slot aggregation factor. In some cases, the first slot aggregation factor is different than the second slot aggregation factor. As an illustrative example, one of the slot aggregation factors may be 1, which may indicate that a transport block may be transmitted once (e.g., a single repetition), and another of the slot aggregation factors may be different (e.g., indicating multiple repetitions of a transport block), although any quantities may be used. In some examples, the control signaling may indicate such information (e.g., the control signaling may indicate the first factor, the second factor, or both) or the UE 115-c may determine the factor(s) based on one or more rules (e.g., the UE 115-c may be pre-configured to determine the factors based on other parameters, among other examples).

The UE 115-c may be configured to switch beam pairs in one or more slots of the aggregated set of slots. For example, the UE 115-c may determine a first beam pair to use for a first subset of slots and a second beam pair to use for a second subset of slots. In some cases, the UE 115-c may determine such beam pairs from a determined beam order. For example, the UE 115-c may be pre-configured with the beam order or the base station may configure the UE 115-c with the beam order via control signaling. Accordingly, the UE 115-c may switch downlink and uplink beams across different slots or different groups of slots when slot aggregation is enabled for uplink communications, downlink communications, or both. Although some operations are described in the context of UE 115-c for illustrative clarity, the techniques described herein may be implemented by any wireless device (e.g., a base station 105).

Figure 4:
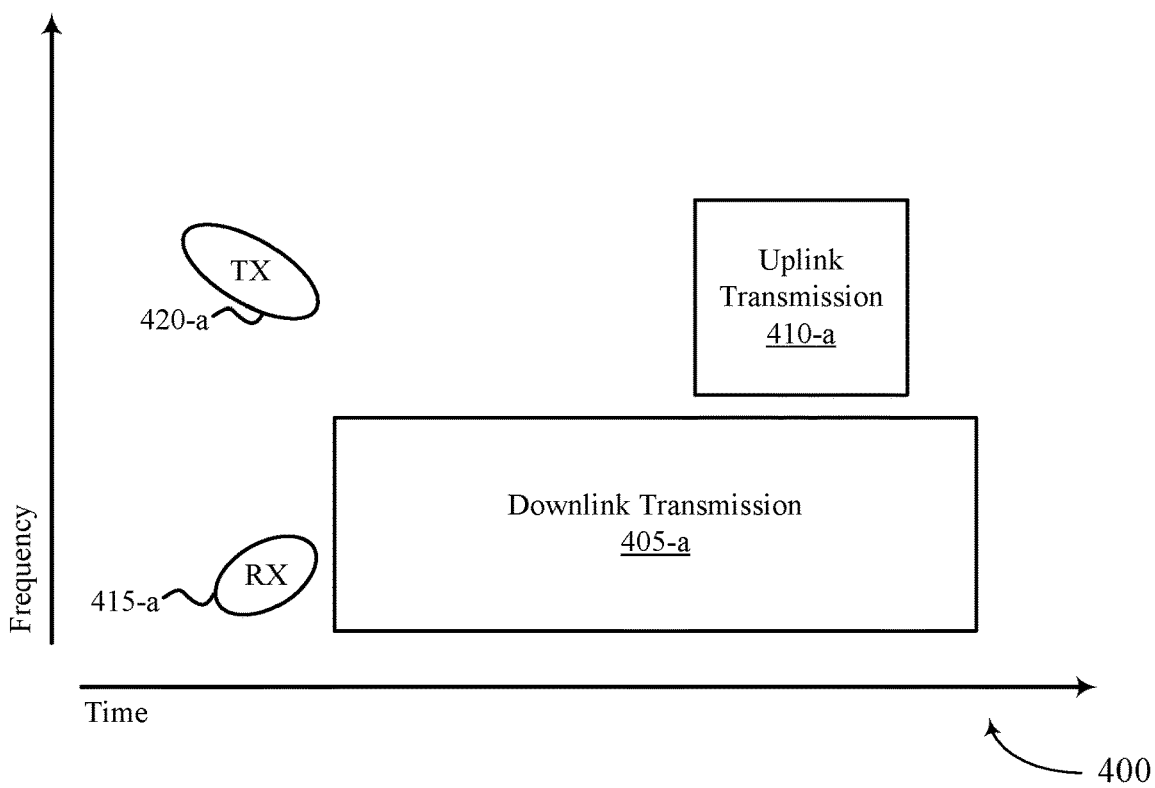
FIGS. 4 and 5 illustrate examples of resource schemes that supports techniques for slot aggregation in full duplex wireless communications systems in accordance with one or more aspects of the present disclosure.
Figure 4:
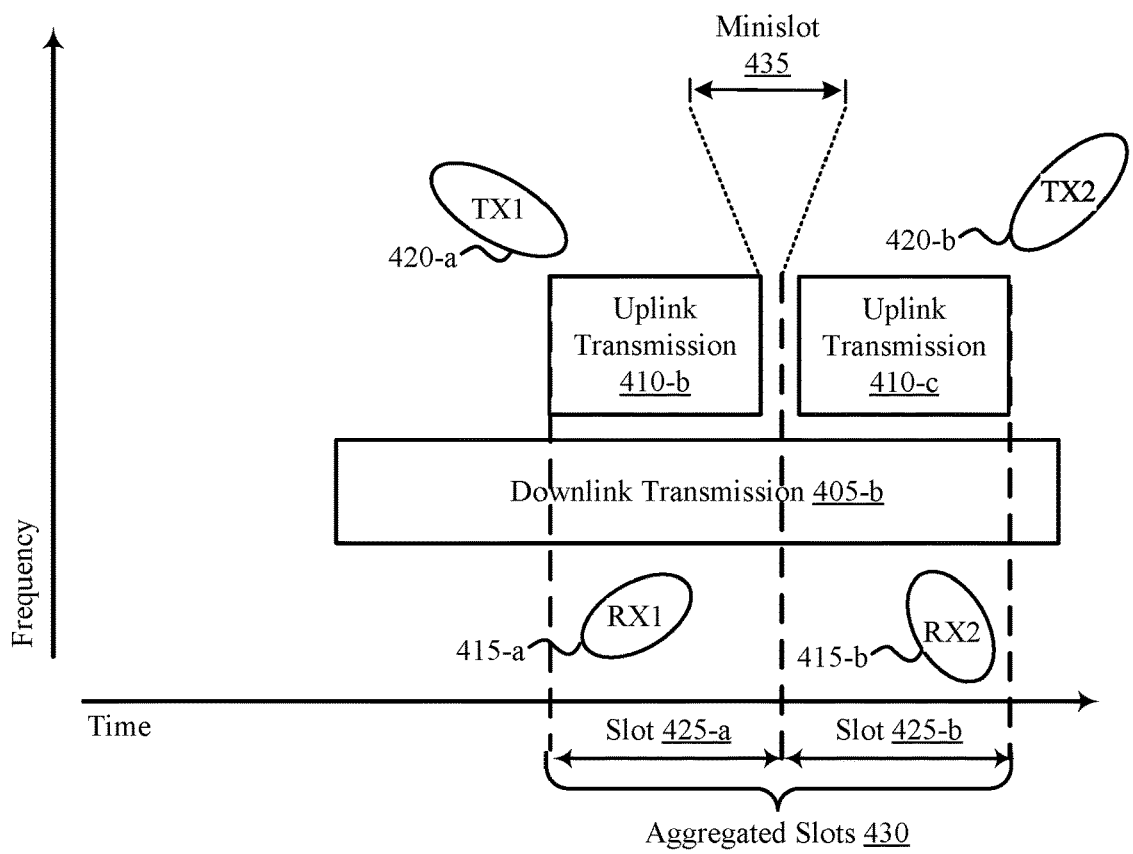

FIG. 4 illustrates an example of a resource scheme 400 and a resource scheme 401 that support techniques for slot aggregation in full duplex wireless communications systems in accordance with one or more aspects of the present disclosure. In some examples, the resource scheme 400 and the resource scheme 401 may implement aspects of wireless communications systems 100, 200, 300, or a combination thereof. For example, the resource schemes may illustrate examples of full duplex communications between a UE 115 and a base station as described herein with reference to FIGS. 1-3.

The resource scheme 400 may illustrate an example of full duplex communications. A wireless device (e.g., a UE 115, a base station 105, etc.) may communicate a downlink transmission 405-a in addition to communicating the uplink transmission 410-a (e.g., the downlink and uplink transmissions may overlap for at least a portion of time). That is, full duplex communications may be enabled at a UE 115, a base station 105, or both. If enabled at a UE 115, the UE 115 may receive from and transmit to two TRPs, as an example. In some cases, full duplex operation may enable the UE to send an uplink transmission 410-a to the base station while the downlink transmission 405-a is on-going, which may reduce a latency of uplink reporting, among other enhancements.

For example, a UE 115 may use a transmission beam 420-a to communicate the uplink transmission 410-a simultaneous with using a reception beam 415-a to receive the downlink transmission 405-a. That is, the transmission beam 420-a and the reception beam 415-a may be an example of a beam pair for full duplex communications. Such communications may be relatively efficient (e.g., high spectral efficiency, faster feedback for the downlink transmission 405-a due to communicating the feedback via the uplink transmission 410-a before the downlink transmission 405-a is finished, etc.).

In some examples, uplink communications or downlink communications or both may implement slot aggregation as described herein with reference to FIG. 2. As an illustrative example, the resource scheme 401 may illustrate an example of slot aggregation in the uplink direction. For instance, the uplink transmissions 410-b and 410-c may include repetitions of data across two TTIs (e.g., an uplink report message may be included in both uplink transmissions 410 and the uplink report may use mini-slot aggregation such that each slot may use a different uplink beam, although any quantity or types of TTIs may be used). As an illustrative example, the uplink transmission 410-b may be transmitted during a first slot 425-a and the uplink transmission 410-c may be transmitted during the slot 425-b (e.g., with a slot aggregation factor of two). The aggregated slots 430 may include two slots 425-a and 425-b, although any quantity or type of TTIs may be used. For example, the aggregated slots 430 may include a set of slots 425 (e.g., the slot 425-a and the slot 425-b), and as described herein a device may use a first beam pair for a first subset of the aggregated slots 430 (e.g., the transmission beam 420-a and the reception beam 415-a during the slot 425-a) and a second beam pair for a second subset of the aggregated slots 430 (e.g., the transmission beam 420-b and the reception beam 415-b during the slot 425-b), although any quantity or type of TTIs or beams may be used. In some cases, the slots 425 may include multiple mini-slots 435.

For example, the uplink transmission 410-b may be transmitted using the transmission beam 420-a (e.g., a first beam of a beam pair) and the uplink transmission 410-c may be transmitted in another TTI using a transmission beam 420-b (e.g., a second beam of the beam pair), which may improve spatial diversity for the uplink message transmitted in both uplink transmissions 410. In some cases, the downlink transmission 405-b may not be configured with slot aggregation. The device may change beams in the downlink direction based on the beam change in the uplink direction. For example, the UE 115 may receive the downlink transmission 405-b using a reception beam 415-a during the TTI corresponding to the uplink transmission 410-b, and the UE 115 may switch beams to receive the downlink transmission 405-b using the reception beam 415-b during the second TTI corresponding to the uplink transmission 410-c. By switching reception beams 415 based on the slot aggregation in the uplink direction (e.g., even if the downlink transmission 405-b does not implement slot aggregation), the UE 115 may realize mitigated self-interference.

Although described for illustrative clarity as the uplink direction using slot aggregation and the downlink direction switching beams not implementing slot aggregation, any combination of directions may use slot aggregation and/or beam switching techniques as described herein. For example, the downlink direction may implement slot aggregation and the uplink direction may not implement slot aggregation, or both directions may implement slot aggregation.

Figure 5:
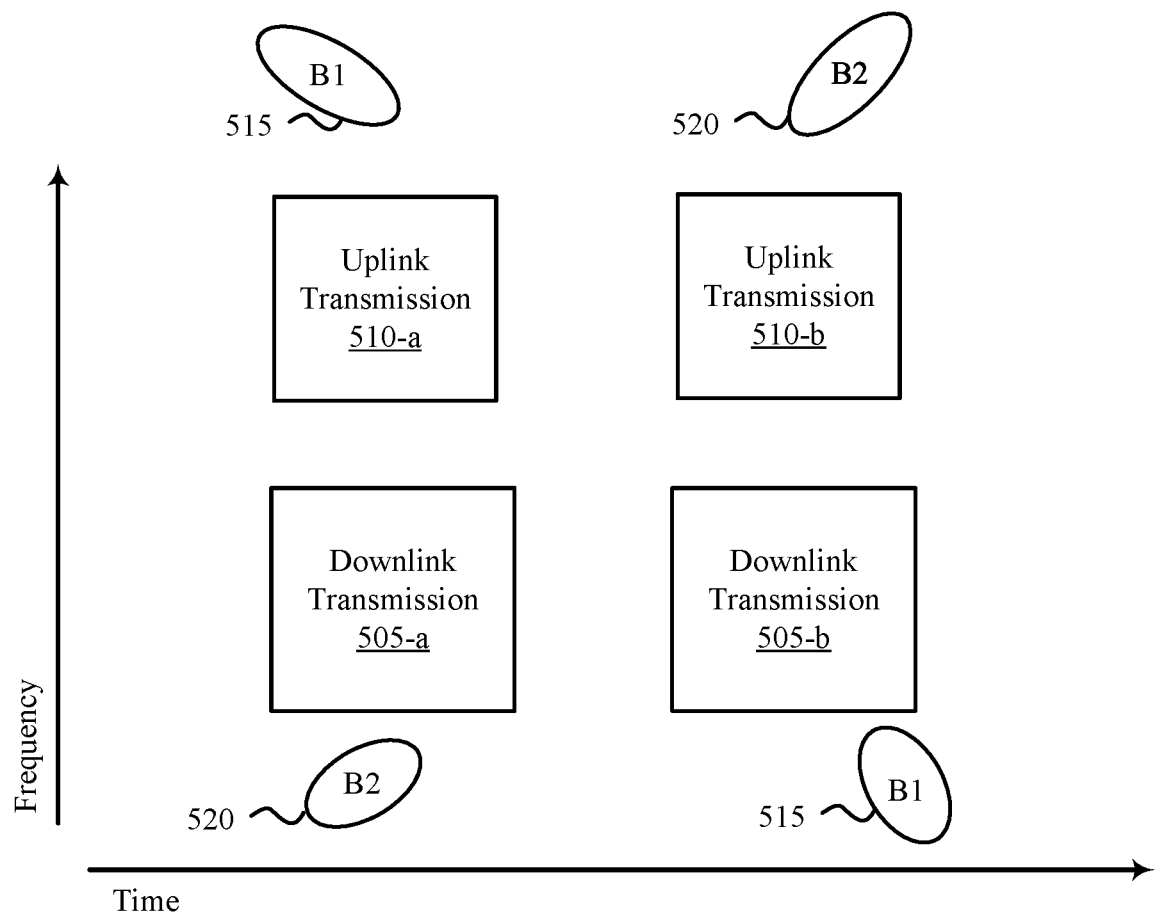

FIG. 5 illustrates an example of a resource scheme 500 that supports techniques for slot aggregation in full duplex wireless communications systems in accordance with one or more aspects of the present disclosure. In some examples, the resource scheme 500 may implement aspects of wireless communications systems 100, 200, 300, or a combination thereof. For example, the resource schemes may illustrate examples of full duplex communications between a UE 115 and a base station as described herein with reference to FIGS. 1-3.

The resource scheme 500 may illustrate an example of full duplex communications implementing beam switching techniques as described herein. For example, a wireless device (e.g., a UE 115, a base station 105, etc.) may communicate downlink transmissions 505 in addition to communicating uplink transmissions 510 (e.g., the downlink and uplink transmissions may overlap for at least a portion of time). That is, full duplex communications may be enabled at a UE 115, a base station 105, or both.

In some examples, the uplink direction, the downlink direction, or both may implement slot aggregation. For example, an uplink payload may be repeated in each TTI of a set of TTIs (e.g., each slot in a set of aggregated slots) for the uplink direction, a downlink payload may be repeated in each TTI of a same or different set of TTIs for the downlink direction, or a combination thereof. If slot aggregation is enabled in one or more directions, devices may be configured to use uplink and downlink beam pairs in different aggregated slots. For example, in a first slot, a UE 115 may transmit the uplink transmission 510-a using a first beam 515 and receive a downlink transmission 505-a using a second beam 520. In another slot, the UE 115 may transmit the uplink transmission 510-b using the second beam 520 and receive the downlink transmission 505-b using the first beam 515. In other words, the UE 115 may swap an uplink/downlink beam pair for different slots when slot aggregation is enabled in one or both directions (e.g., the beam pair used for a first slot or group of slots may be the inverse of a beam pair used for a second slot of second group of slots). Thus, different uplink beams and downlink beams may be selected for different slots.

For example, even if the uplink direction is slot aggregated and the downlink direction is not using slot aggregation, the UE 115 may be configured to change beam pairs based on the uplink beam changes (or vice versa). For example, the UE 115 may switch from using beam 515 for uplink and beam 520 for downlink to different beams for both uplink and downlink communications (e.g., an inverse of the beams, or other different beams such as a third beam and a fourth beam, or a combination thereof) based on the uplink beam change due to the slot aggregation. In such examples, the uplink beam change may enhance spatial diversity and the downlink beam may be changed to reduce self-interference. Such examples may be implemented for any direction, quantity of beams, quantity of slots or groups of slots, etc.

In some examples, the devices may determine beam pairs for each slot (e.g., the devices may determine a beam order indicating which beams to use for each TTI or groups of TTIs). For example, the devices may alternate between a first beam pair (e.g., the beam 515 for uplink communications and the beam 520 for downlink communications) and a second beam pair (e.g., the beam 520 for uplink communications and the beam 515 for downlink communications, or different beams) for each slot in a set of aggregated slots for uplink communications, downlink communications, or both. As another example, the devices may alternate between the beam pairs for a group of slots (e.g., one or more consecutive slots may use beam 515 for uplink and beam 520 for downlink, one or more subsequent consecutive slots may use beam 520 for uplink and beam 515 for downlink or other beams, etc.).

Figure 6:
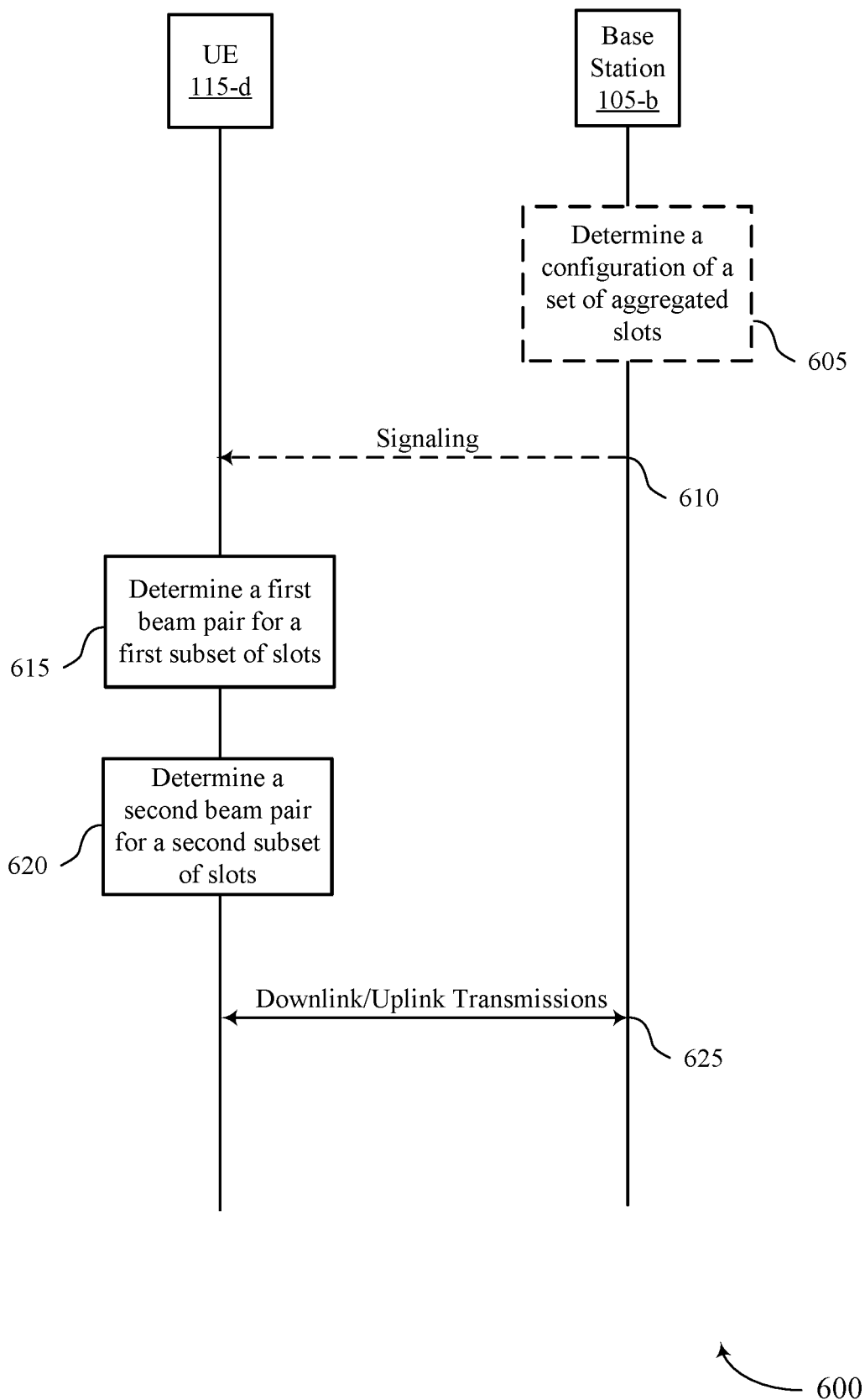
FIG. 6 illustrates an example of a process flow that supports techniques for slot aggregation in full duplex wireless communications systems in accordance with one or more aspects of the present disclosure.

FIG. 6 illustrates an example of a process flow 600 that supports techniques for slot aggregation in full duplex wireless communications systems in accordance with one or more aspects of the present disclosure. In some examples, the process flow 600 may implement aspects of wireless communications systems 100, 200, 300, or a combination thereof. For example, the process flow 600 may include a UE 115-d and a base station 105-b, which may be examples of the corresponding devices described herein. In some examples, the UE 115-d, the base station 105-b, or both may operate in a full duplex mode. The process flow 600 may illustrate beam techniques when slot aggregation is enabled for uplink communications, downlink communications, or both for such full duplex operations.

In the following description of the process flow 600, the operations between the base station 105-b and the UE 115-d may be transmitted in a different order than the example order shown, or the operations performed by the base station 105-b and the UE 115-d may be performed in different orders or at different times, or the operations performed by a device may additionally or alternatively be performed by another device. Some operations may also be omitted from the process flow 600, and other operations may be added to the process flow 600. The base station 105-b and the UE 115-d may be examples of a base station 105 and a UE 115 as described with reference to FIGS. 1 through 5.

In some examples, at 605 the base station 105-b may determine a configuration of a set of aggregated slots. For example, the base station 105-b may determine that uplink communications, downlink communications, or both are associated with slot aggregation. Additionally or alternatively, the base station 105-d may determine a factor of slot aggregation for the set of aggregated slots. In some examples, the configuration may include an indication of one or more beams. For example, the configuration may indicate a beam order for the set of aggregated slots (e.g., the base station 105-b may determine an uplink beam and a downlink beam for a beam pair to be used in one or more slots, such as for each slot on the set of aggregated slots).

In some examples, at 610 the base station 105-b may transmit signaling to the UE 115-d indicating the configuration (e.g., the base station 105-b may transmit an indication of the configuration to the UE 115-d). For example, the base station 105-b may transmit an RRC message, a MAC-CE message, or a DCI message, or any combination thereof. Such signaling may indicate slot aggregation for uplink communications, downlink communications, or both (e.g., the signaling may include an activation or deactivation of slot aggregation for uplink communications, downlink communications, or both). In some examples, the signaling may indicate a factor of slot aggregation (e.g., the slot aggregation factor K may represent the quantity of retransmissions of a transport block, a quantity of slots for the retransmissions, or both). In some examples, the signaling may indicate one or more beams to use for the downlink communications, uplink communications, or both. For example, the signaling may indicate the beam order (e.g., multiple beams with an order indicating which beams are to be used in which slots of the aggregated slots), which may enable the UE 115-d to use the beams in the beam order.

At 615, the UE 115-d may determine a first beam pair for a first subset of slots. For example, the UE 115-d may select an uplink beam and a downlink beam for the first subset of slots. In some examples, the UE 115-d may be configured with the first beam pair (e.g., the base station 105-b may indicate the beam order including the first beam pair corresponding to the first subset of slots) or the UE 115-d may determine the beam pair based on one or more rules (e.g., the UE 115-d may be preconfigured to select the beam pair for alternating slots when slot aggregation is enabled in one or more directions, among other examples).

At 620, the UE 115-d may determine a second beam pair for a second subset of slots. For example, the UE 115-d may select an uplink beam (e.g., an uplink beam different than the uplink beam used in the first subset of slots, such as the beam used for downlink communications in the first subset of slots or another beam) and a downlink beam (e.g., a downlink beam different than the downlink beam used in the first subset of slots, such as the beam used for uplink communications in the first subset of slots or another beam) for the second subset of slots. In some examples, the UE 115-d may be configured with the second beam pair (e.g., the base station 105-b may indicate the beam order including the second beam pair corresponding to the second subset of slots) or the UE 115-d may determine the second beam pair based on one or more rules (e.g., the UE 115-d may be preconfigured to select the second beam pair for alternating slots when slot aggregation is enabled in one or more directions, among other examples).

At 625, the UE 115-d and the base station 105-b may communicate in accordance with the determined beam pairs. For example, the UE 115-d may communicate uplink communications using a first beam and downlink communications using a second beam in the first subset of slots. The UE 115-d may communicate uplink communications using the second beam or a third beam in the second subset of slots, in addition or alternative to communicating downlink communications using the first beam or a fourth beam in the second subset of slots.

In some examples, the UE 115-d may alternate between the first beam pair and the second beam pair for each slot or group of slots. For example, a first slot (or group of slots) may use the first beam pair, a second slot (or group of slots) may use the second beam pair, a third slot (or group of slots) may use the first beam pair, etc., although any quantity of beam pairs, slots, and beam configurations for each slot or group of slots may be used.

Figure 7:
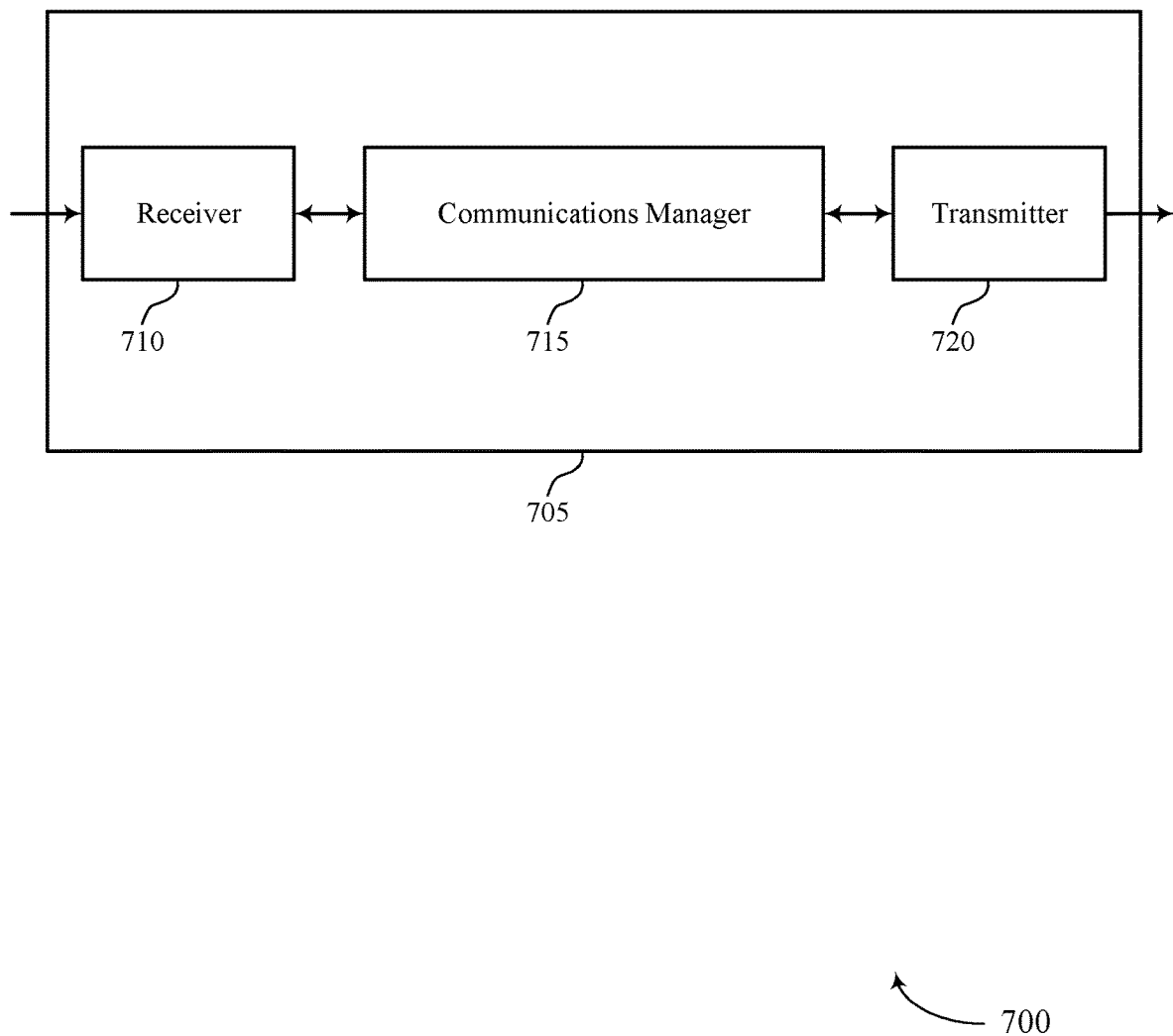
FIGS. 7 and 8 show block diagrams of devices that support techniques for slot aggregation in full duplex wireless communications systems in accordance with one or more aspects of the present disclosure.

FIG. 7 shows a block diagram 700 of a device 705 that supports techniques for slot aggregation in full duplex wireless communications systems in accordance with one or more aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to techniques for slot aggregation in full duplex wireless communication systems, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may receive an indication of a configuration of a set of aggregated slots for the wireless communications, determine a first beam pair for the wireless communications during a first subset of aggregated slots of the set of aggregated slots based on the configuration, the wireless communications including uplink communications, downlink communications, or both, determine a second beam pair for the wireless communications during a second subset of aggregated slots of the set of aggregated slot based on the configuration, the second beam pair different from the first beam pair, and communicate the wireless communications using the first beam pair during the first subset of aggregated slots and the second beam pair during the second subset of aggregated slots. The communications manager 715 may be an example of aspects of the communications manager 1010 described herein.

Additionally or alternatively, the communications manager 715 may receive, when in a full duplex mode, an indication of a configuration of a set of aggregated slots for the wireless communications, the configuration indicating a first beam pair for the wireless communications during a first subset of aggregated slots of the set of aggregated slots and a second beam pair for the wireless communications during a second subset of aggregated slots of the set of aggregated slots, the second beam pair being different from the first beam pair, and the wireless communications comprising uplink communications, downlink communications, or a combination thereof, the configuration indicating a first slot aggregation factor associated with the uplink communications and a second slot aggregation factor associated with the downlink communications; and communicate the wireless communications using the first beam pair during the first subset of aggregated slots and the second beam pair during the second subset of aggregated slots.

The communications manager 715 may be an example of means for performing various aspects of slot aggregation techniques as described herein. The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

In another implementation, the communications manager 715, or its sub-components, may be implemented in code (e.g., as communications management software or firmware) executed by a processor, or any combination thereof. If implemented in code executed by a processor, the functions of the communications manager 715, or its sub-components may be executed by a general-purpose processor, a digital signal processor (DSP), an application-specific integrated circuit (ASIC), a field programmable gate array (FPGA) or other programmable logic device. In some examples, the communications manager 715 may be configured to perform various operations (e.g., receiving, determining, transmitting, communicating, selecting, etc.) using or otherwise in cooperation with the receiver 710, the transmitter 720, or both.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The communications manager 715 may be implemented as an integrated circuit or chipset for the device 705, and the receiver 710 and the transmitter 720 may be implemented as analog components (for example, amplifiers, filters, antennas) coupled with the device 705 modem to enable wireless transmission and reception. At least one implementation may enable the communications manager 715 to support beam selection techniques, slot aggregation for uplink or downlink communications or both, while the device 705 is operating in a full duplex mode. Based on implementing such techniques while the device 705 is operating in a full duplex mode, one or more processors of the device 705 (for example, processor(s) controlling or incorporated with the communications manager 715) may experience reduced self-interference, improved communications reliability (e.g., improved spatial diversity across slots), or a combination thereof, among other examples.

The transmitter 720 may transmit signals generated by other components of the device 705. In some examples, the transmitter 720 may be collocated with a receiver 710 in a transceiver component. For example, the transmitter 720 may be an example of aspects of the transceiver 1020 described with reference to FIG. 10. The transmitter 720 may utilize a single antenna or a set of antennas.

Figure 8:
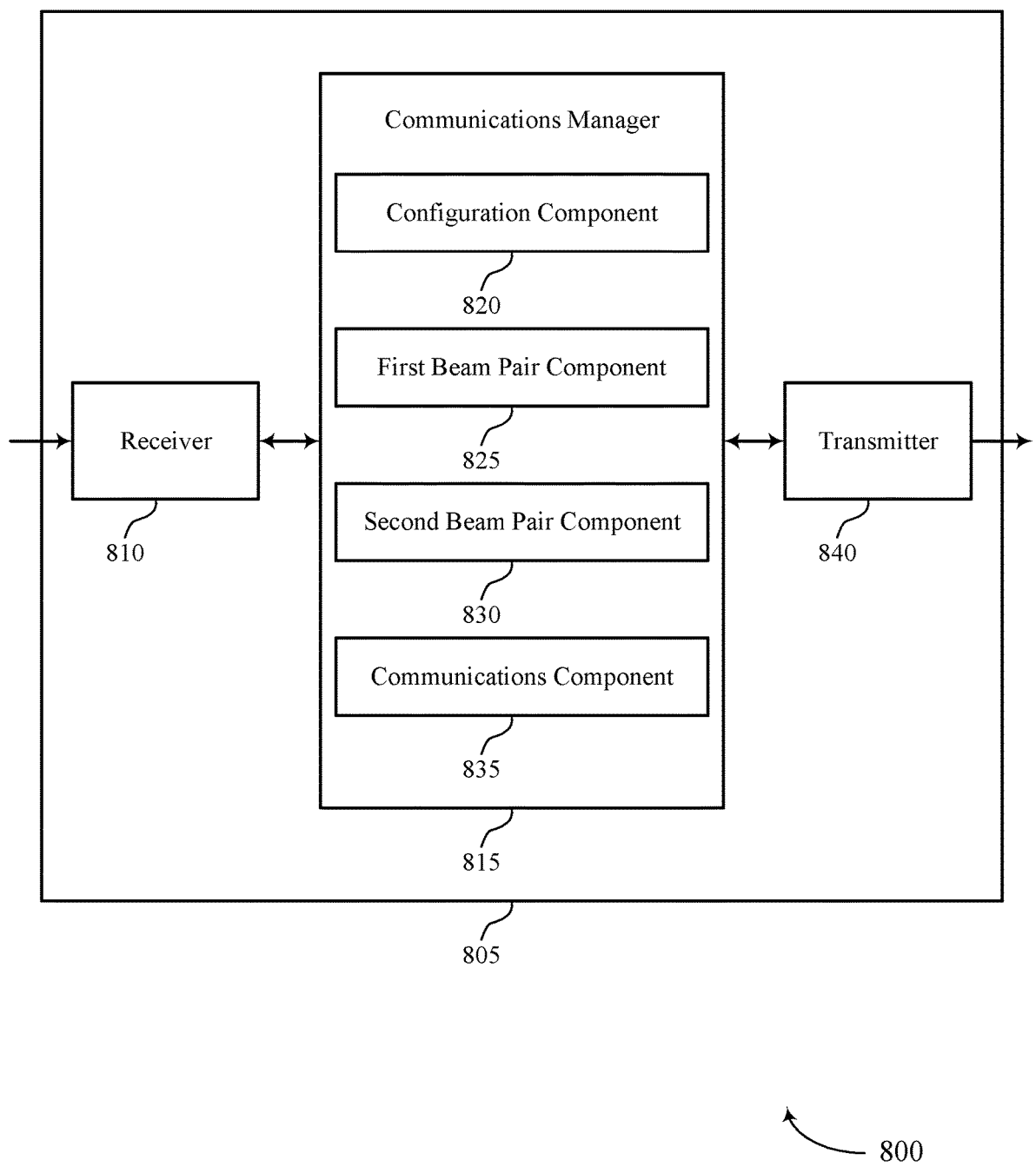

FIG. 8 shows a block diagram 800 of a device 805 that supports techniques for slot aggregation in full duplex wireless communications systems in accordance with one or more aspects of the present disclosure. The device 805 may be an example of aspects of a device 705, or a UE 115 as described herein. The device 805 may include a receiver 810, a communications manager 815, and a transmitter 840. The device 805 may also include a processor. Each of these components may be in communication with one another (e.g., via one or more buses).

The receiver 810 may receive information such as packets, user data, or control information associated with various information channels (e.g., control channels, data channels, and information related to techniques for slot aggregation in full duplex wireless communication systems, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a configuration component 820, a first beam pair component 825, a second beam pair component 830, and a communications component 835. The communications manager 815 may be an example of aspects of the communications manager 1010 described herein. The configuration component 820 may receive an indication of a configuration of a set of aggregated slots for the wireless communications. The first beam pair component 825 may determine a first beam pair for the wireless communications during a first subset of aggregated slots of the set of aggregated slots based on the configuration, the wireless communications including uplink communications, downlink communications, or both. The second beam pair component 830 may determine a second beam pair for the wireless communications during a second subset of aggregated slots of the set of aggregated slots based on the configuration, the second beam pair different from the first beam pair. The communications component 835 may communicate the wireless communications using the first beam pair during the first subset of aggregated slots and the second beam pair during the second subset of aggregated slots.

Additionally or alternatively, the communications component 835 may receive, when in a full duplex mode, an indication of a configuration of a set of aggregated slots for the wireless communications, the configuration indicating a first beam pair for the wireless communications during a first subset of aggregated slots of the set of aggregated slots and a second beam pair for the wireless communications during a second subset of aggregated slots of the set of aggregated slots, the second beam pair being different from the first beam pair, and the wireless communications comprising uplink communications, downlink communications, or a combination thereof, the configuration indicating a first slot aggregation factor associated with the uplink communications and a second slot aggregation factor associated with the downlink communications. The communications component 835 may communicate the wireless communications using the first beam pair during the first subset of aggregated slots and the second beam pair during the second subset of aggregated slots.

The transmitter 840 may transmit signals generated by other components of the device 805. In some examples, the transmitter 840 may be collocated with a receiver 810 in a transceiver component. For example, the transmitter 840 may be an example of aspects of the transceiver 1020 described with reference to FIG. 10. The transmitter 840 may utilize a single antenna or a set of antennas.

Figure 9:
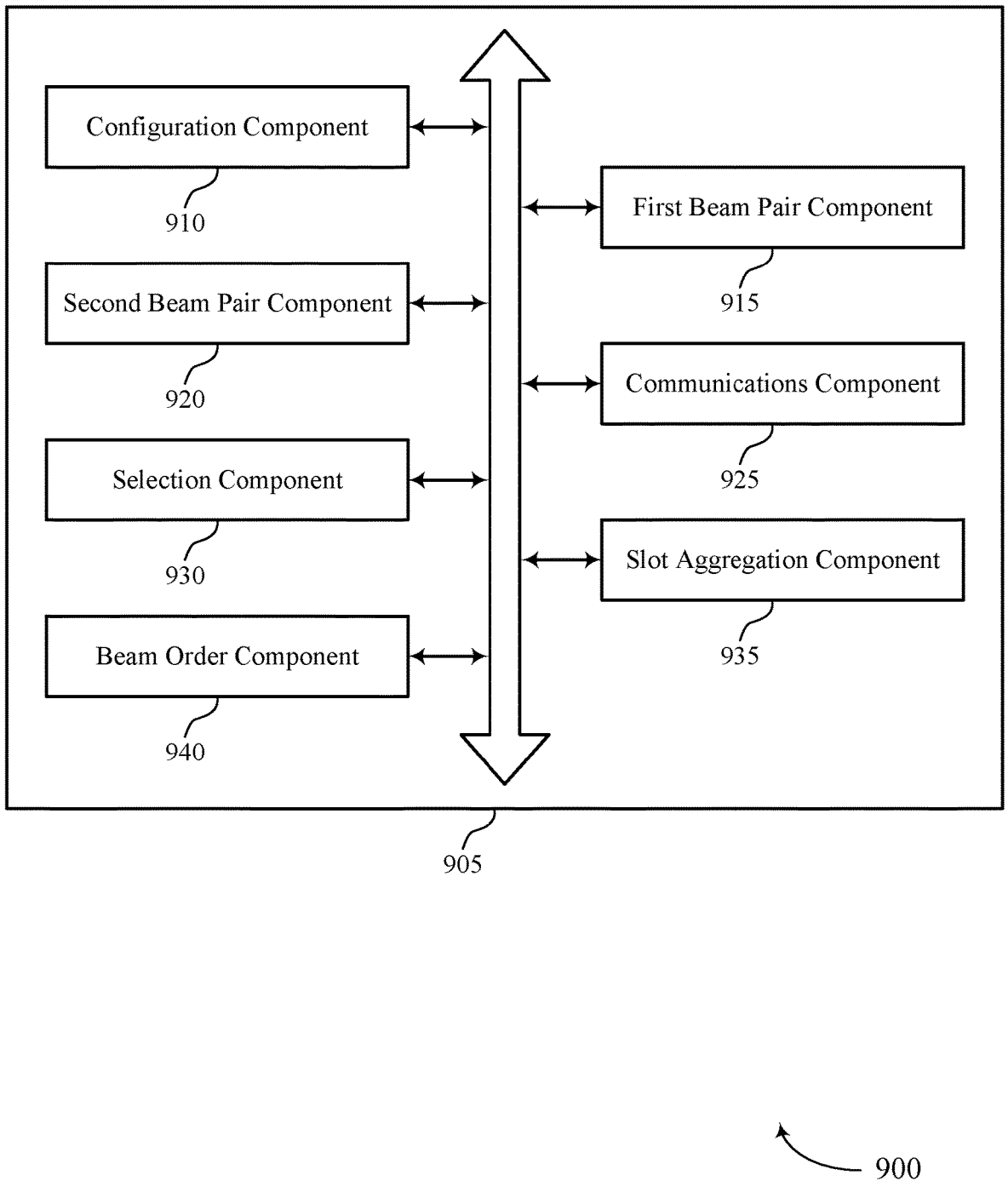
FIG. 9 shows a block diagram of a communications manager that supports techniques for slot aggregation in full duplex wireless communications systems in accordance with one or more aspects of the present disclosure.

FIG. 9 shows a block diagram 900 of a communications manager 905 that supports techniques for slot aggregation in full duplex wireless communications systems in accordance with one or more aspects of the present disclosure. The communications manager 905 may be an example of aspects of a communications manager 715, a communications manager 815, or a communications manager 1010 described herein. The communications manager 905 may include a configuration component 910, a first beam pair component 915, a second beam pair component 920, a communications component 925, a selection component 930, a slot aggregation component 935, and a beam order component 940. Each of these components may communicate, directly or indirectly, with one another (e.g., via one or more buses).

The configuration component 910 may receive an indication of a configuration of a set of aggregated slots for the wireless communications. In some examples, the configuration component 910 may receive a RRC message, a MAC-CE message, or a DCI message, or a combination thereof, including the indication of the configuration of the set of aggregated slots for the uplink communications, the downlink communications, or both, where communicating the wireless communications using the first beam pair during the first subset of aggregated slots and the second beam pair during the second subset of aggregated slots is based on the received RRC message, the MAC-CE message, or the DCI message, or a combination thereof. The first beam pair component 915 may determine a first beam pair for the wireless communications during a first subset of aggregated slots of the set of aggregated slots based on the configuration, the wireless communications including uplink communications, downlink communications, or both. The second beam pair component 920 may determine a second beam pair for the wireless communications during a second subset of aggregated slots of the set of aggregated slots based on the configuration, the second beam pair different from the first beam pair. In some cases, the second beam pair includes an inverse of the first beam pair.

The configuration component 910 may receive, when in a full duplex mode, an indication of a configuration of a set of aggregated slots for the wireless communications. The configuration indicating a first beam pair for the wireless communications during a first subset of aggregated slots of the set of aggregated slots and a second beam pair for the wireless communications during a second subset of aggregated slots of the set of aggregated slots. The second beam pair being different from the first beam pair, and the wireless communications comprising uplink communications, downlink communications, or a combination thereof. The configuration indicating a first slot aggregation factor associated with the uplink communications and a second slot aggregation factor associated with the downlink communications.

The communications component 925 may communicate the wireless communications using the first beam pair during the first subset of aggregated slots and the second beam pair during the second subset of aggregated slots. In some examples, the communications component 925 may transmit, during the first subset of aggregated slots, the uplink communications using a first beam. In some examples, the communications component 925 may receive, during the first subset of aggregated slots, the downlink communications using a second beam. In some examples, the communications component 925 may transmit, during the second subset of aggregated slots, the uplink communications using the second beam or a third beam. In some examples, the communications component 925 may receive, during the second subset of aggregated slots, the downlink communications using the first beam or a fourth beam. The selection component 930 may select a first beam for the uplink communications and a second beam for the downlink communications based on the first subset of aggregated slots of the set of aggregated slots, where communicating the wireless communications includes. In some examples, the selection component 930 may select the second beam for the uplink communications and the first beam for the downlink communications based on the second subset of aggregated slots of the set of aggregated slots. The communications component 925 may communicate the wireless communications using the first beam pair during the first subset of aggregated slots and the second beam pair during the second subset of aggregated slots.

The slot aggregation component 935 may determine a slot aggregation factor based on the configuration, where communicating the wireless communications using the first beam pair during the first subset of aggregated slots and the second beam pair during the second subset of aggregated slots is based on the determined slot aggregation factor. In some cases, the first subset of aggregated slots is different from the second subset of aggregated slots. In some cases, each slot of the first subset of aggregated slots alternates with each slot of the second subset of aggregated slots. In some cases, the first subset of aggregated slots, or the second subset of aggregated slots, or both, include one or more groups of slots. The beam order component 940 may determine a beam order associated with the set of aggregated slots based on the configuration, where communicating the wireless communications using the first beam pair during the first subset of aggregated slots and the second beam pair during the second subset of aggregated slots is based on the determined beam order.

Figure 10:
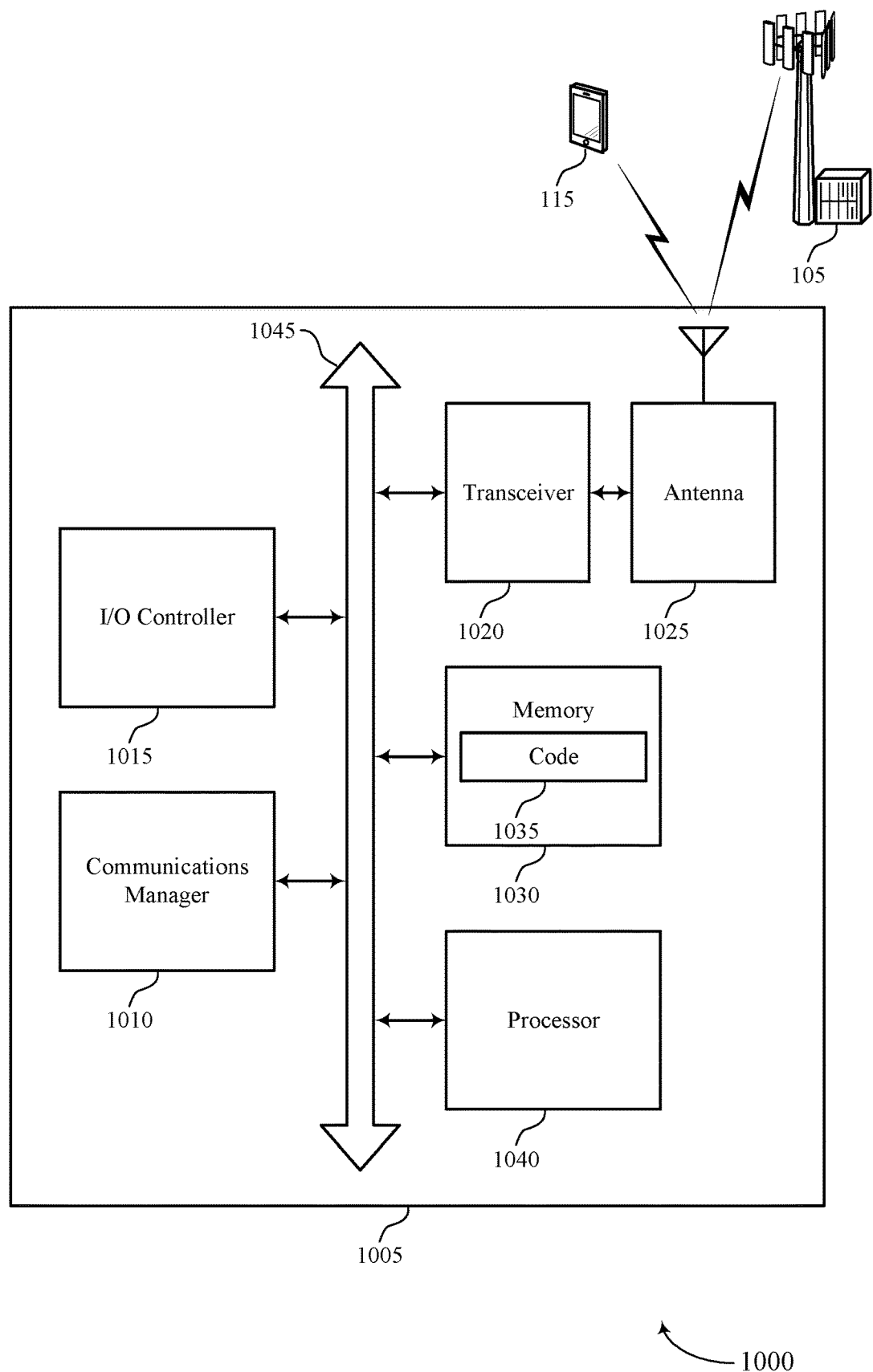
FIG. 10 shows a diagram of a system including a device that supports techniques for slot aggregation in full duplex wireless communications systems in accordance with one or more aspects of the present disclosure.

FIG. 10 shows a diagram of a system 1000 including a device 1005 that supports techniques for slot aggregation in full duplex wireless communications systems in accordance with one or more aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may receive an indication of a configuration of a set of aggregated slots for the wireless communications, determine a first beam pair for the wireless communications during a first subset of aggregated slots of the set of aggregated slots based on the configuration, the wireless communications including uplink communications, downlink communications, or both, determine a second beam pair for the wireless communications during a second subset of aggregated slots of the set of aggregated slot based on the configuration, the second beam pair different from the first beam pair, and communicate the wireless communications using the first beam pair during the first subset of aggregated slots and the second beam pair during the second subset of aggregated slots.

Additionally or alternatively, the communications manager 1010 may receive, when in a full duplex mode, an indication of a configuration of a set of aggregated slots for the wireless communications, the configuration indicating a first beam pair for the wireless communications during a first subset of aggregated slots of the set of aggregated slots and a second beam pair for the wireless communications during a second subset of aggregated slots of the set of aggregated slots, the second beam pair being different from the first beam pair, and the wireless communications comprising uplink communications, downlink communications, or a combination thereof, the configuration indicating a first slot aggregation factor associated with the uplink communications and a second slot aggregation factor associated with the downlink communications. The communications manager 1010 may communicate the wireless communications using the first beam pair during the first subset of aggregated slots and the second beam pair during the second subset of aggregated slots.

The actions performed by the communications manager 1010 as described herein may be implemented to realize one or more potential enhancements. At least one implementation may enable the communications manager 1010 to support beam selection techniques, slot aggregation for uplink or downlink communications or both. Based on implementing such techniques, one or more processors of the device 1005 (for example, processor(s) controlling or incorporated with the communications manager 1010) may experience reduced self-interference, improved communications reliability (e.g., improved spatial diversity across slots), or a combination thereof, among other enhancements.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas. In some cases, the device 1005 may include a single antenna 1025. However, in some cases, the device 1005 may have more than one antenna 1025, which may be capable of concurrently transmitting or receiving multiple wireless transmissions.

The memory 1030 may include random-access memory (RAM) and read-only memory (ROM). The memory 1030 may store computer-readable, computer-executable code 1035 including instructions that, when executed, cause the processor to perform various functions described herein. In some cases, the memory 1030 may contain, among other things, a basic input/output system (BIOS) which may control basic hardware or software operation such as the interaction with peripheral components or devices.

The processor 1040 may include an intelligent hardware device, (e.g., a general-purpose processor, a digital signal processor (DSP), a CPU, a microcontroller, an ASIC, a field programmable gate array (FPGA), a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting techniques for slot aggregation in full duplex wireless communication systems).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
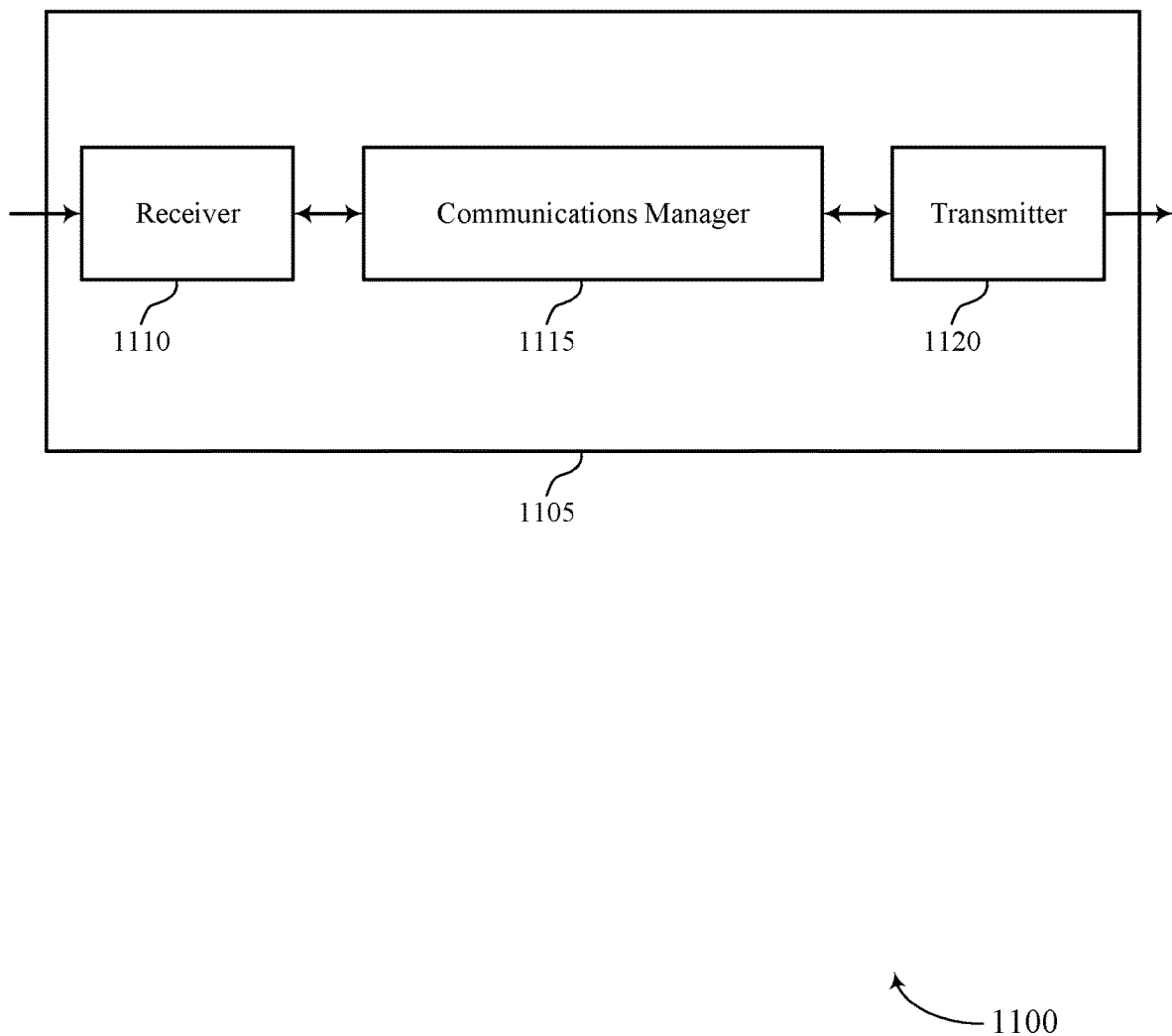
FIGS. 11 and 12 show block diagrams of devices that support techniques for slot aggregation in full duplex wireless communications systems in accordance with one or more aspects of the present disclosure.

FIG. 11 shows a block diagram 1100 of a device 1105 that supports techniques for slot aggregation in full duplex wireless communications systems in accordance with one or more aspects of the present disclosure. The device 1105 may be an example of aspects of a base station 105 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to techniques for slot aggregation in full duplex wireless communications systems, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may transmit, to a UE, an indication of a configuration of a set of aggregated slots for the wireless communications when the UE is operating in a full duplex mode, determine a first beam pair for the wireless communications during a first subset of aggregated slots of the set of aggregated slots, the wireless communications including uplink communications, downlink communications, or both, determine a second beam pair for the wireless communications during a second subset of aggregated slots of the set of aggregated slot, the second beam pair different from the first beam pair, and communicate the wireless communications using the first beam pair during the first subset of aggregated slots and the second beam pair during the second subset of aggregated slots. The communications manager 1115 may be an example of aspects of the communications manager 1410 described herein.

Additionally or alternatively, the communications manager 1115 may transmit, to a UE, an indication of a configuration of a set of aggregated slots for the wireless communications, the configuration indicating a first beam pair for the wireless communications during a first subset of aggregated slots of the set of aggregated slots and a second beam pair for the wireless communications during a second subset of aggregated slots of the set of aggregated slots, the second beam pair being different from the first beam pair, the wireless communications comprising uplink communications, downlink communications, or a combination thereof, the configuration indicating a first slot aggregation factor associated with the uplink communications and a second slot aggregation factor associated with the downlink communications; and communicating the wireless communications using the first beam pair during the first subset of aggregated slots and the second beam pair during the second subset of aggregated slots.

The communications manager 1115, may be an example of means for performing various aspects of slot aggregation techniques as described herein. The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

In another implementation, the communications manager 1115, or its sub-components, may be implemented in code (e.g., as communications management software or firmware) executed by a processor, or any combination thereof. If implemented in code executed by a processor, the functions of the communications manager 1115, or its sub-components may be executed by a general-purpose processor, a digital signal processor (DSP), an application-specific integrated circuit (ASIC), a field programmable gate array (FPGA) or other programmable logic device. In some examples, the communications manager 1115 may be configured to perform various operations (e.g., receiving, determining, transmitting, communicating, selecting, etc.) using or otherwise in cooperation with the receiver 1110, the transmitter 1120, or both.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver component. For example, the transmitter 1120 may be an example of aspects of the transceiver 1420 described with reference to FIG. 14. The transmitter 1120 may utilize a single antenna or a set of antennas.

Figure 12:
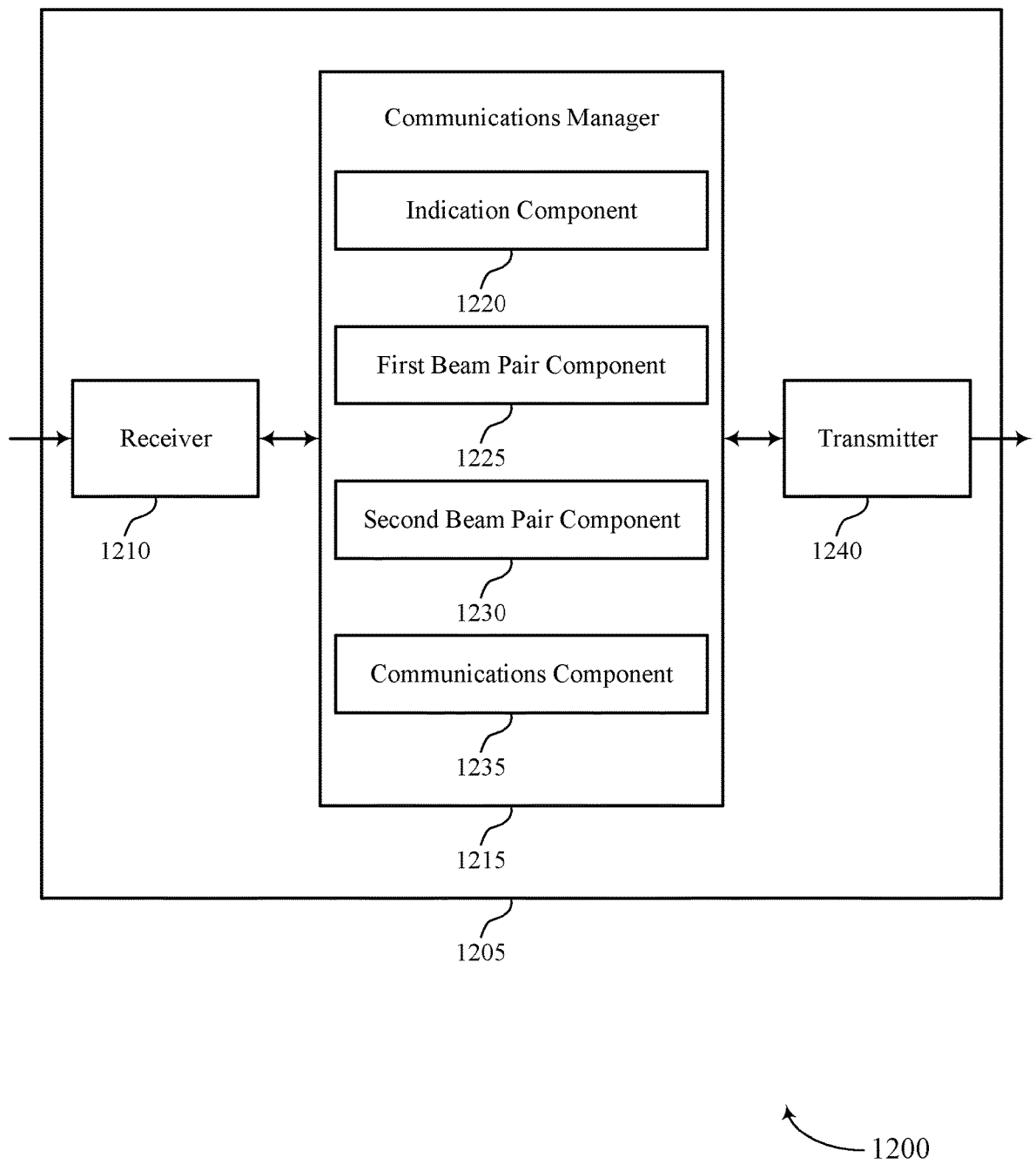

FIG. 12 shows a block diagram 1200 of a device 1205 that supports techniques for slot aggregation in full duplex wireless communications systems in accordance with one or more aspects of the present disclosure. The device 1205 may be an example of aspects of a device 1105, or a base station 105 as described herein. The device 1205 may include a receiver 1210, a communications manager 1215, and a transmitter 1240. The device 1205 may also include a processor. Each of these components may be in communication with one another (e.g., via one or more buses).

The receiver 1210 may receive information such as packets, user data, or control information associated with various information channels (e.g., control channels, data channels, and information related to techniques for slot aggregation in full duplex wireless communication systems, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include an indication component 1220, a first beam pair component 1225, a second beam pair component 1230, and a communications component 1235. The communications manager 1215 may be an example of aspects of the communications manager 1410 described herein. The indication component 1220 may transmit, to a UE, an indication of a configuration of a set of aggregated slots for the wireless communications when the UE is operating in a full duplex mode. The first beam pair component 1225 may determine a first beam pair for the wireless communications during a first subset of aggregated slots of the set of aggregated slots, the wireless communications including uplink communications, downlink communications, or both. The second beam pair component 1230 may determine a second beam pair for the wireless communications during a second subset of aggregated slots of the set of aggregated slots, the second beam pair different from the first beam pair. The communications component 1235 may communicate the wireless communications using the first beam pair during the first subset of aggregated slots and the second beam pair during the second subset of aggregated slots.

Additionally or alternatively, the indication component 1220 may transmit, to a UE, an indication of a configuration of a set of aggregated slots for the wireless communications. The configuration indicating a first beam pair for the wireless communications during a first subset of aggregated slots of the set of aggregated slots and a second beam pair for the wireless communications during a second subset of aggregated slots of the set of aggregated slots. The second beam pair being different from the first beam pair. The wireless communications comprising uplink communications, downlink communications, or a combination thereof. The configuration indicating a first slot aggregation factor associated with the uplink communications and a second slot aggregation factor associated with the downlink communications. The communications component 1235 may communicate the wireless communications using the first beam pair during the first subset of aggregated slots and the second beam pair during the second subset of aggregated slots.

The transmitter 1240 may transmit signals generated by other components of the device 1205. In some examples, the transmitter 1240 may be collocated with a receiver 1210 in a transceiver component. For example, the transmitter 1240 may be an example of aspects of the transceiver 1420 described with reference to FIG. 14. The transmitter 1240 may utilize a single antenna or a set of antennas.

Figure 13:
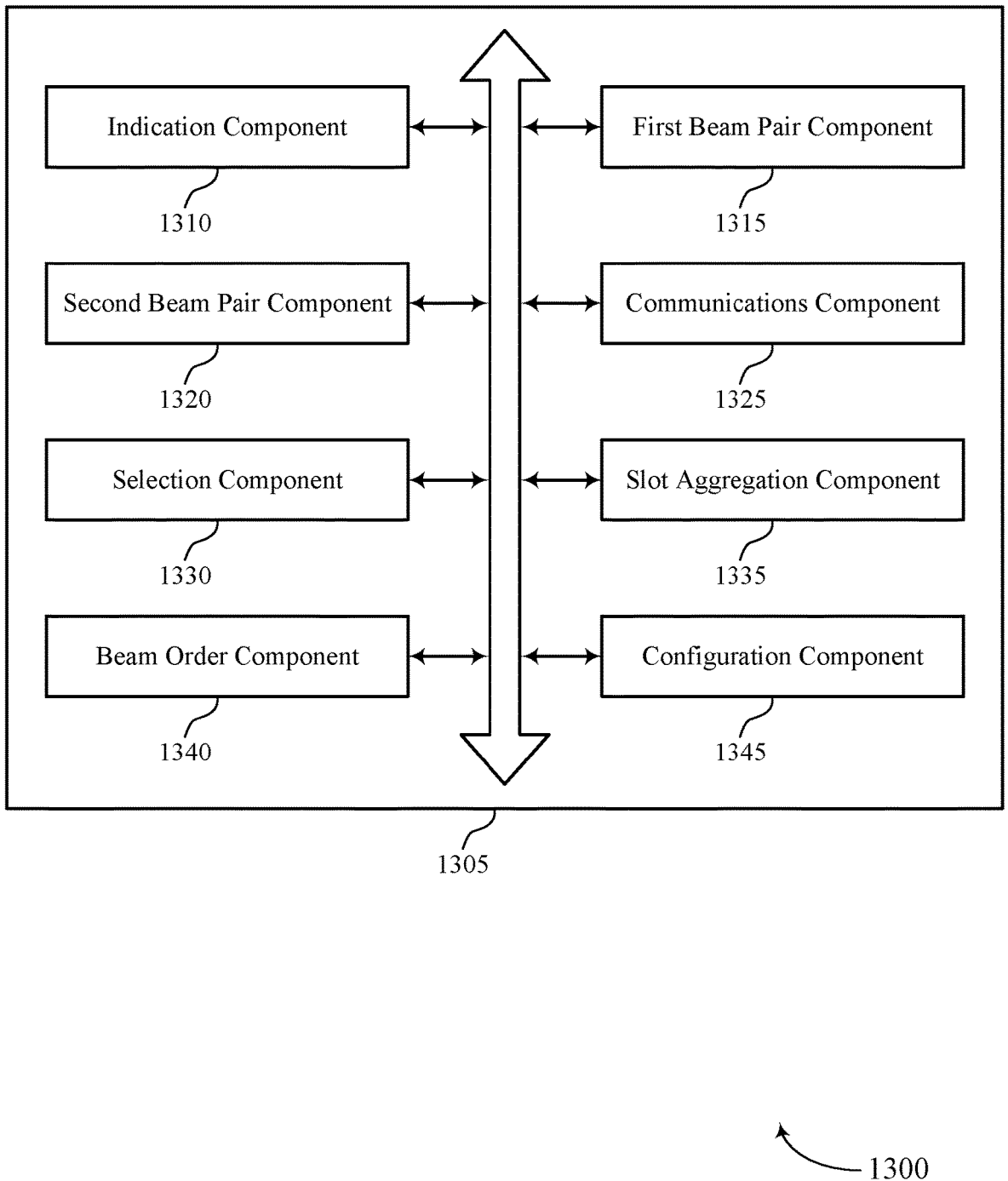
FIG. 13 shows a block diagram of a communications manager that supports techniques for slot aggregation in full duplex wireless communications systems in accordance with one or more aspects of the present disclosure.

FIG. 13 shows a block diagram 1300 of a communications manager 1305 that supports techniques for slot aggregation in full duplex wireless communications systems in accordance with one or more aspects of the present disclosure. The communications manager 1305 may be an example of aspects of a communications manager 1115, a communications manager 1215, or a communications manager 1410 described herein. The communications manager 1305 may include an indication component 1310, a first beam pair component 1315, a second beam pair component 1320, a communications component 1325, a selection component 1330, a slot aggregation component 1335, a beam order component 1340, and a configuration component 1345. Each of these components may communicate, directly or indirectly, with one another (e.g., via one or more buses).

The indication component 1310 may transmit, to a UE, an indication of a configuration of a set of aggregated slots for the wireless communications when the UE is operating in a full duplex mode. The first beam pair component 1315 may determine a first beam pair for the wireless communications during a first subset of aggregated slots of the set of aggregated slots, the wireless communications including uplink communications, downlink communications, or both. The second beam pair component 1320 may determine a second beam pair for the wireless communications during a second subset of aggregated slots of the set of aggregated slots, the second beam pair different from the first beam pair. In some cases, the second beam pair includes an inverse of the first beam pair.

The communications component 1325 may communicate the wireless communications using the first beam pair during the first subset of aggregated slots and the second beam pair during the second subset of aggregated slots. In some examples, the communications component 1325 may receive, during the first subset of aggregated slots, the uplink communications using a first beam. In some examples, the communications component 1325 may transmit, during the first subset of aggregated slots, the downlink communications using a second beam. In some examples, the communications component 1325 may receive, during the second subset of aggregated slots, the uplink communications using the second beam or a third beam. In some examples, the communications component 1325 may transmit, during the second subset of aggregated slots, the downlink communications using the first beam or a fourth beam. The selection component 1330 may select a first beam for the uplink communications and a second beam for the downlink communications based on the first subset of aggregated slots of the set of aggregated slots. In some examples, the selection component 1330 may select the second beam for the uplink communications and the first beam for the downlink communications based on the second subset of aggregated slots of the set of aggregated slots.

The indication component 1310 may transmit, to a UE, an indication of a configuration of a set of aggregated slots for the wireless communications. The configuration indicating a first beam pair for the wireless communications during a first subset of aggregated slots of the set of aggregated slots and a second beam pair for the wireless communications during a second subset of aggregated slots of the set of aggregated slots. The second beam pair being different from the first beam pair. The wireless communications comprising uplink communications, downlink communications, or a combination thereof. The configuration indicating a first slot aggregation factor associated with the uplink communications and a second slot aggregation factor associated with the downlink communications. The communications component 1325 may communicate the wireless communications using the first beam pair during the first subset of aggregated slots and the second beam pair during the second subset of aggregated slots.

The slot aggregation component 1335 may determine a slot aggregation factor, where communicating the wireless communications using the first beam pair during the first subset of aggregated slots and the second beam pair during the second subset of aggregated slots is based on the determined slot aggregation factor. In some cases, the first subset of aggregated slots is different from the second subset of aggregated slots. In some cases, each slot of the first subset of aggregated slots alternates with each slot of the second subset of aggregated slots. In some cases, the first subset of aggregated slots, or the second subset of aggregated slots, or both, include one or more groups of slots.

The beam order component 1340 may determine a beam order associated with the set of aggregated slots based on the configuration, where communicating the wireless communications using the first beam pair during the first subset of aggregated slots and the second beam pair during the second subset of aggregated slots is based on the determined beam order.

The configuration component 1345 may transmit a RRC message, a MAC-CE message, or a DCI message, or a combination thereof, including the indication of the configuration of the set of aggregated slots for the uplink communications, the downlink communications, or both, where communicating the wireless communications using the first beam pair during the first subset of aggregated slots and the second beam pair during the second subset of aggregated slots is based on the transmitted RRC message, the MAC-CE message, or the DCI message, or a combination thereof.

Figure 14:
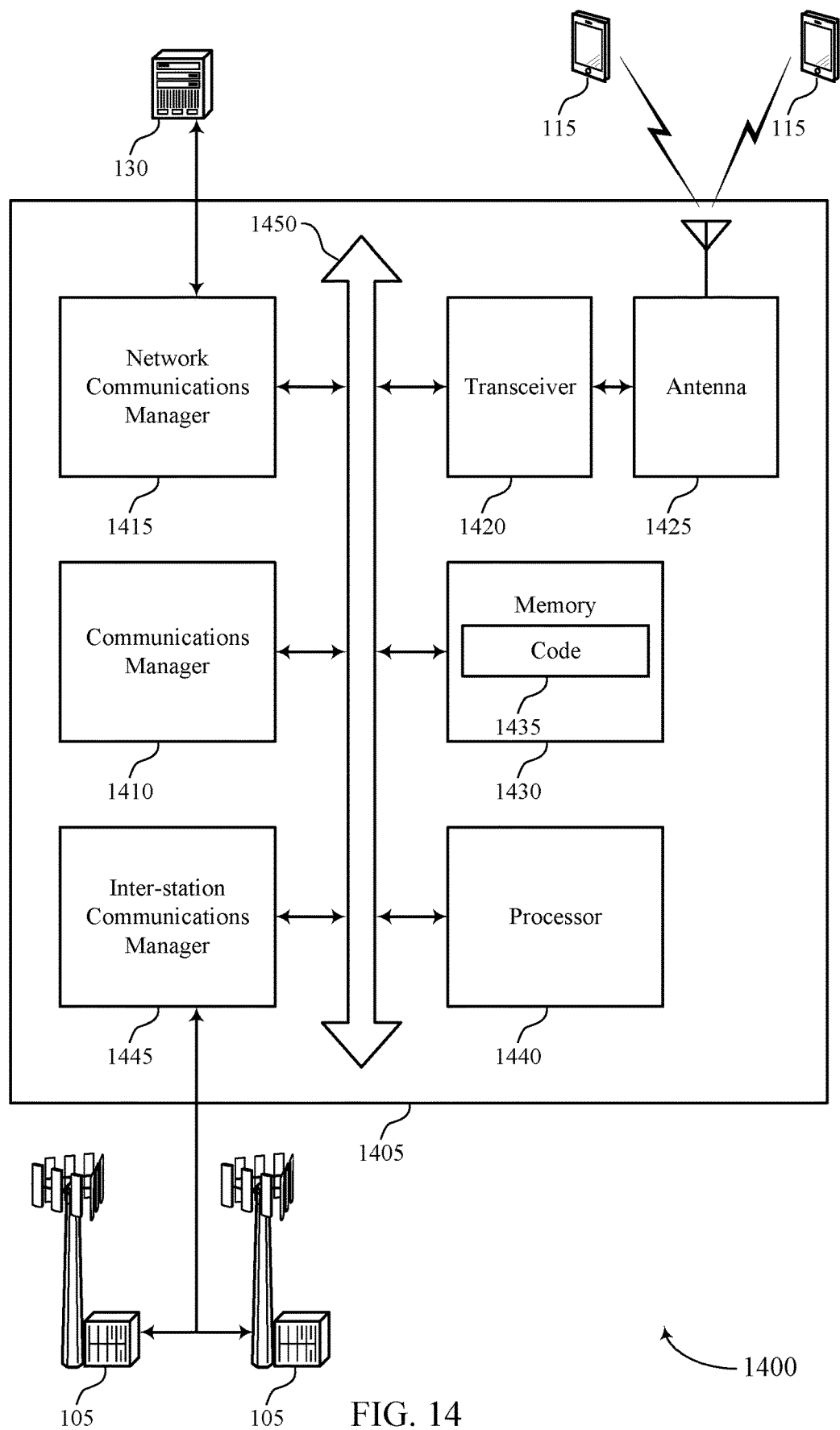
FIG. 14 shows a diagram of a system including a device that supports techniques for slot aggregation in full duplex wireless communications systems in accordance with one or more aspects of the present disclosure.

FIG. 14 shows a diagram of a system 1400 including a device 1405 that supports techniques for slot aggregation in full duplex wireless communications systems in accordance with one or more aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communications manager 1410 may transmit, to a UE, an indication of a configuration of a set of aggregated slots for the wireless communications when the UE is operating in a full duplex mode. The communications manager 1410 may determine a first beam pair for the wireless communications during a first subset of aggregated slots of the set of aggregated slots, the wireless communications including uplink communications, downlink communications, or both. The communications manager 1410 may determine a second beam pair for the wireless communications during a second subset of aggregated slots of the set of aggregated slots, the second beam pair different from the first beam pair. The communications manager 1410 may communicate the wireless communications using the first beam pair during the first subset of aggregated slots and the second beam pair during the second subset of aggregated slots.

Additionally or alternatively, the communications manager 1410 may transmit, to a UE, an indication of a configuration of a set of aggregated slots for the wireless communications, the configuration indicating a first beam pair for the wireless communications during a first subset of aggregated slots of the set of aggregated slots and a second beam pair for the wireless communications during a second subset of aggregated slots of the set of aggregated slots, the second beam pair being different from the first beam pair, the wireless communications comprising uplink communications, downlink communications, or a combination thereof, the configuration indicating a first slot aggregation factor associated with the uplink communications and a second slot aggregation factor associated with the downlink communications. The communications manager 1410 may communicate the wireless communications using the first beam pair during the first subset of aggregated slots and the second beam pair during the second subset of aggregated slots.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas. In some cases, the device 1405 may include a single antenna 1425. However, in some cases, the device 1405 may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting techniques for slot aggregation in full duplex wireless communication systems).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
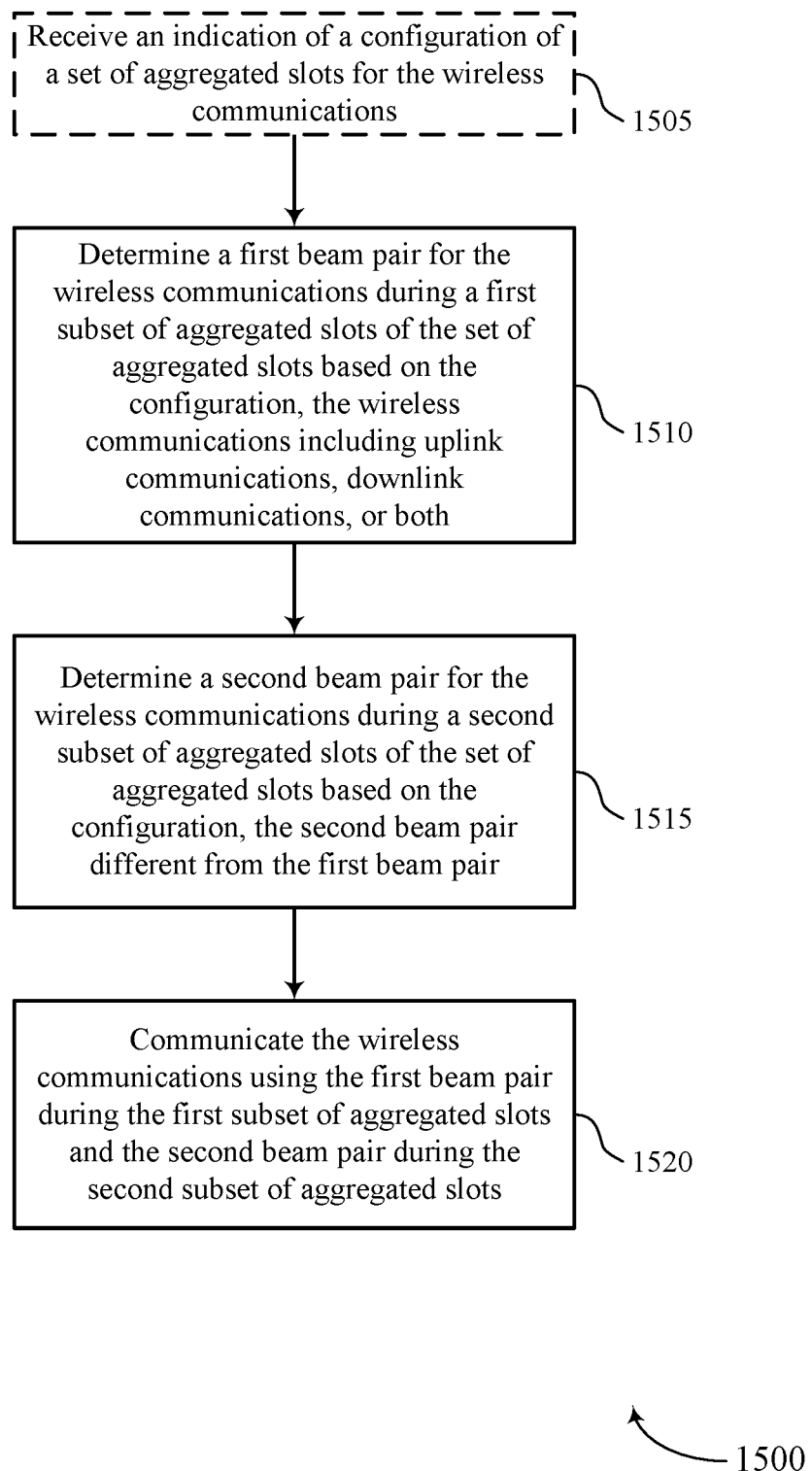
FIGS. 15 through 20 show flowcharts illustrating methods that support techniques for slot aggregation in full duplex wireless communications systems in accordance with one or more aspects of the present disclosure.

FIG. 15 shows a flowchart illustrating a method 1500 that supports techniques for slot aggregation in full duplex wireless communications systems in accordance with one or more aspects of the present disclosure. The operations of method 1500 may be implemented by a UE 115 or its components as described herein. For example, the operations of method 1500 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1505, the UE may receive an indication of a configuration of a set of aggregated slots for the wireless communications. The operations of 1505 may be performed according to the methods described herein. In some examples, aspects of the operations of 1505 may be performed by a configuration receiver as described with reference to FIGS. 7 through 10.

At 1510, the UE may determine a first beam pair for the wireless communications during a first subset of aggregated slots of the set of aggregated slots based on the configuration, the wireless communications including uplink communications, downlink communications, or both. The operations of 1510 may be performed according to the methods described herein. In some examples, aspects of the operations of 1510 may be performed by a first beam pair component as described with reference to FIGS. 7 through 10.

At 1515, the UE may determine a second beam pair for the wireless communications during a second subset of aggregated slots of the set of aggregated slots based on the configuration, the second beam pair different from the first beam pair. The operations of 1515 may be performed according to the methods described herein. In some examples, aspects of the operations of 1515 may be performed by a second beam pair component as described with reference to FIGS. 7 through 10.

At 1520, the UE may communicate the wireless communications using the first beam pair during the first subset of aggregated slots and the second beam pair during the second subset of aggregated slots. The operations of 1520 may be performed according to the methods described herein. In some examples, aspects of the operations of 1520 may be performed by a communications component as described with reference to FIGS. 7 through 10.

Figure 16:
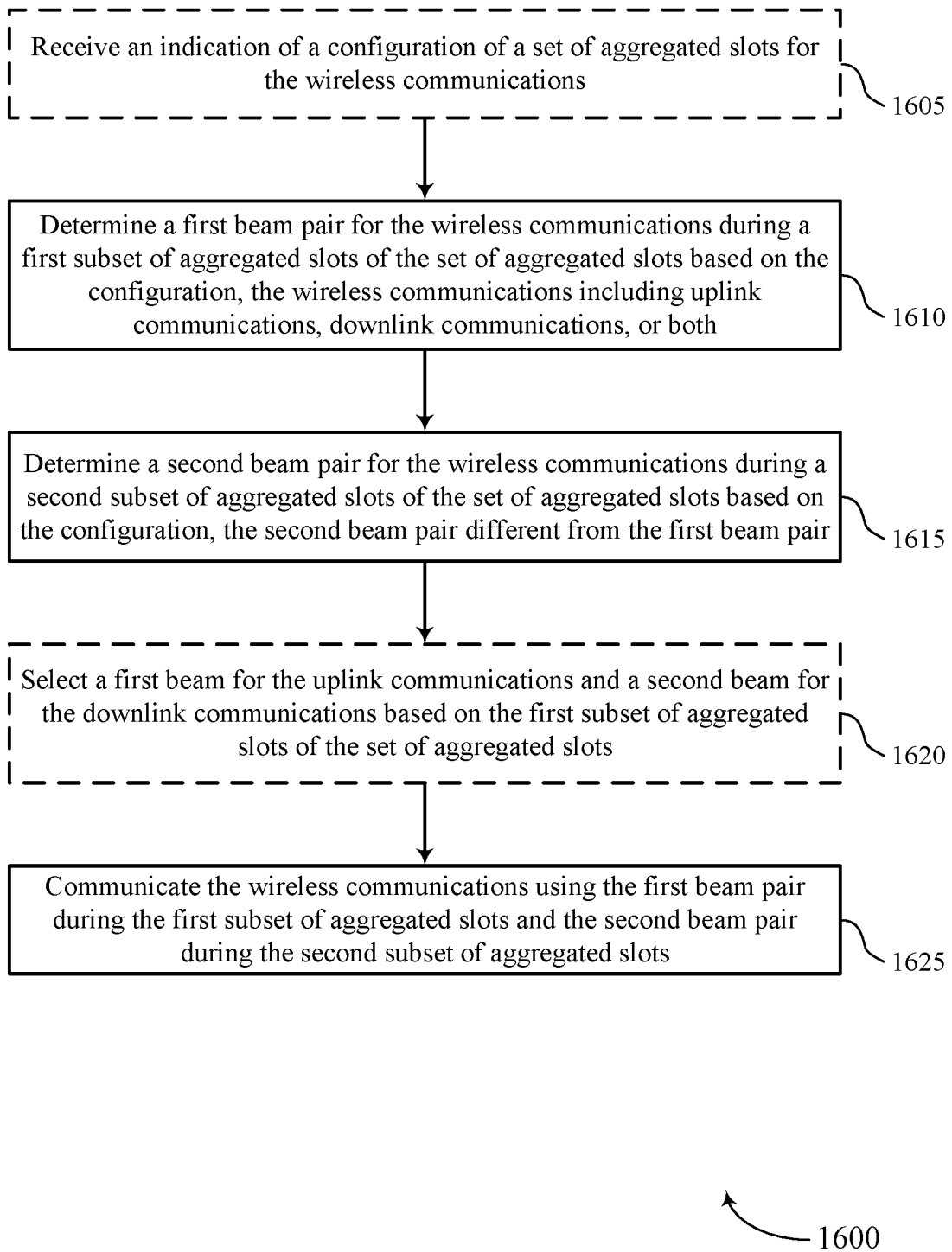

FIG. 16 shows a flowchart illustrating a method 1600 that supports techniques for slot aggregation in full duplex wireless communications systems in accordance with one or more aspects of the present disclosure. The operations of method 1600 may be implemented by a UE 115 or its components as described herein. For example, the operations of method 1600 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1605 the UE may receive an indication of a configuration of a set of aggregated slots for the wireless communications. The operations of 1605 may be performed according to the methods described herein. In some examples, aspects of the operations of 1605 may be performed by a configuration receiver as described with reference to FIGS. 7 through 10.

At 1610, the UE may determine a first beam pair for the wireless communications during a first subset of aggregated slots of the set of aggregated slots based on the configuration, the wireless communications including uplink communications, downlink communications, or both. The operations of 1610 may be performed according to the methods described herein. In some examples, aspects of the operations of 1610 may be performed by a first beam pair component as described with reference to FIGS. 7 through 10.

At 1615, the UE may determine a second beam pair for the wireless communications during a second subset of aggregated slots of the set of aggregated slots based on the configuration, the second beam pair different from the first beam pair. The operations of 1615 may be performed according to the methods described herein. In some examples, aspects of the operations of 1615 may be performed by a second beam pair component as described with reference to FIGS. 7 through 10.

At 1620 the UE may select a first beam for the uplink communications and a second beam for the downlink communications based on the first subset of aggregated slots of the set of aggregated slots. The operations of 1620 may be performed according to the methods described herein. In some examples, aspects of the operations of 1620 may be performed by a selection component as described with reference to FIGS. 7 through 10.

At 1625, the UE may communicate the wireless communications using the first beam pair during the first subset of aggregated slots and the second beam pair during the second subset of aggregated slots. The operations of 1625 may be performed according to the methods described herein. In some examples, aspects of the operations of 1625 may be performed by a communications component as described with reference to FIGS. 7 through 10.

Figure 17:
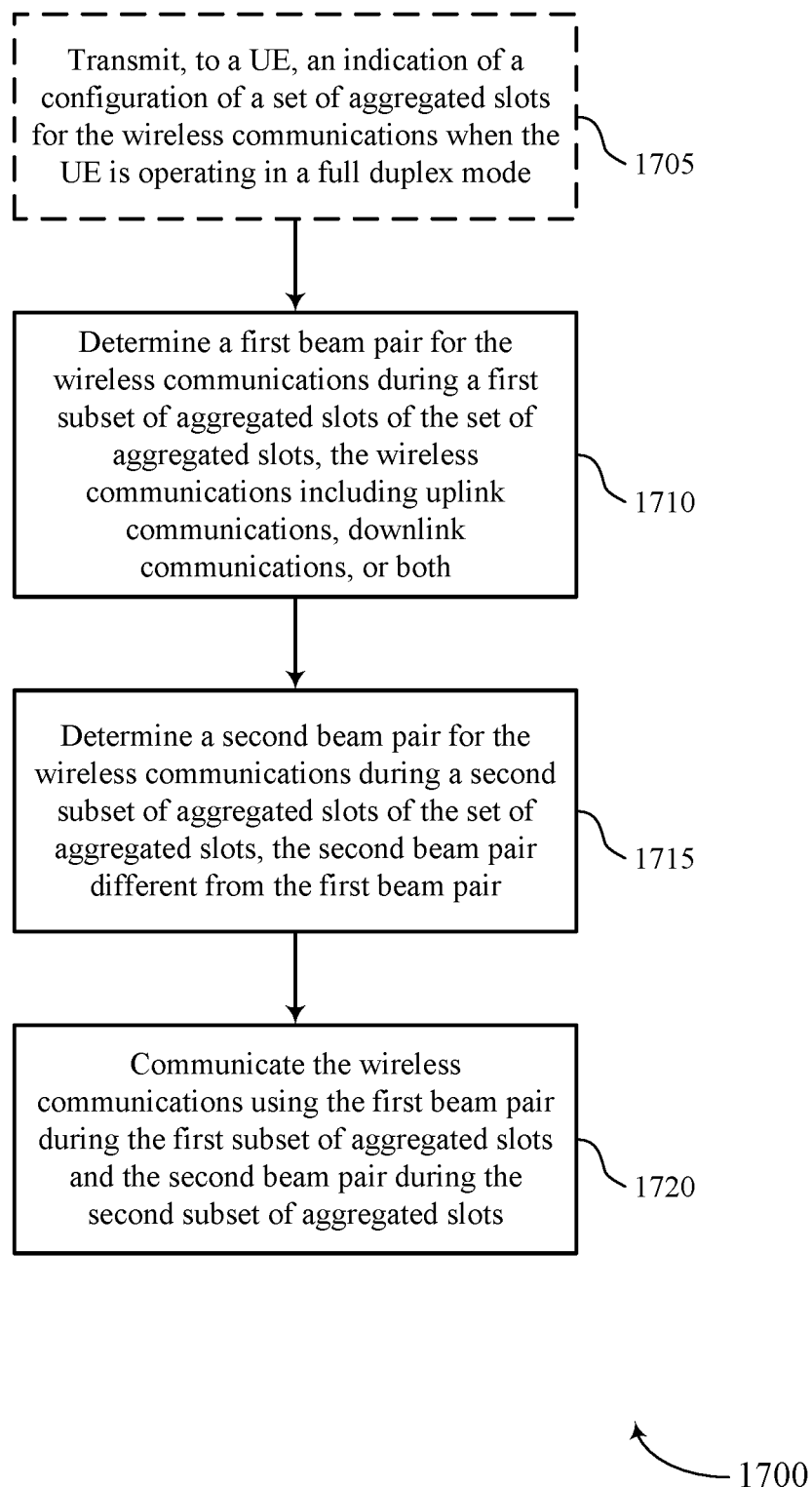

FIG. 17 shows a flowchart illustrating a method 1700 that supports techniques for slot aggregation in full duplex wireless communications systems in accordance with one or more aspects of the present disclosure. The operations of method 1700 may be implemented by a base station 105 or its components as described herein. For example, the operations of method 1700 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 1705 the base station may transmit, to a UE, an indication of a configuration of a set of aggregated slots for the wireless communications when the UE is operating in a full duplex mode. The operations of 1705 may be performed according to the methods described herein. In some examples, aspects of the operations of 1705 may be performed by an indication component as described with reference to FIGS. 11 through 14.

At 1710, the base station may determine a first beam pair for the wireless communications during a first subset of aggregated slots of the set of aggregated slots, the wireless communications including uplink communications, downlink communications, or both. The operations of 1710 may be performed according to the methods described herein. In some examples, aspects of the operations of 1710 may be performed by a first beam pair component as described with reference to FIGS. 11 through 14.

At 1715, the base station may determine a second beam pair for the wireless communications during a second subset of aggregated slots of the set of aggregated slots, the second beam pair different from the first beam pair. The operations of 1715 may be performed according to the methods described herein. In some examples, aspects of the operations of 1715 may be performed by a second beam pair component as described with reference to FIGS. 11 through 14.

At 1720, the base station may communicate the wireless communications using the first beam pair during the first subset of aggregated slots and the second beam pair during the second subset of aggregated slots. The operations of 1720 may be performed according to the methods described herein. In some examples, aspects of the operations of 1720 may be performed by a communications component as described with reference to FIGS. 11 through 14.

Figure 18:
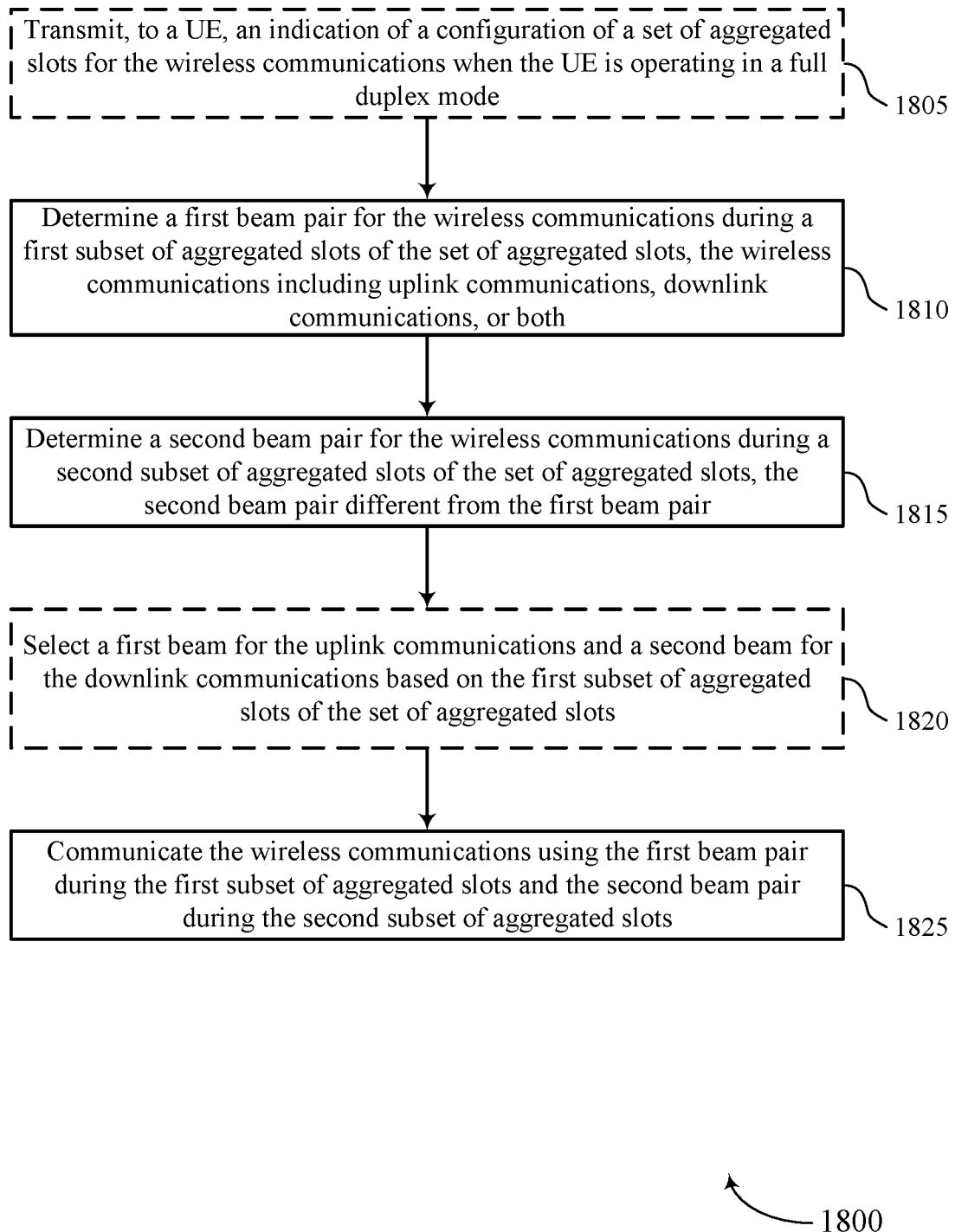

FIG. 18 shows a flowchart illustrating a method 1800 that supports techniques for slot aggregation in full duplex wireless communications systems in accordance with one or more aspects of the present disclosure. The operations of method 1800 may be implemented by a base station 105 or its components as described herein. For example, the operations of method 1800 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 1805 the base station may transmit, to a UE, an indication of a configuration of a set of aggregated slots for the wireless communications when the UE is operating in a full duplex mode. The operations of 1805 may be performed according to the methods described herein. In some examples, aspects of the operations of 1805 may be performed by an indication component as described with reference to FIGS. 11 through 14.

At 1810, the base station may determine a first beam pair for the wireless communications during a first subset of aggregated slots of the set of aggregated slots, the wireless communications including uplink communications, downlink communications, or both. The operations of 1810 may be performed according to the methods described herein. In some examples, aspects of the operations of 1810 may be performed by a first beam pair component as described with reference to FIGS. 11 through 14.

At 1815, the base station may determine a second beam pair for the wireless communications during a second subset of aggregated slots of the set of aggregated slots, the second beam pair different from the first beam pair. The operations of 1815 may be performed according to the methods described herein. In some examples, aspects of the operations of 1815 may be performed by a second beam pair component as described with reference to FIGS. 11 through 14.

At 1820 the base station may select a first beam for the uplink communications and a second beam for the downlink communications based on the first subset of aggregated slots of the set of aggregated slots. The operations of 1820 may be performed according to the methods described herein. In some examples, aspects of the operations of 1820 may be performed by a selection component as described with reference to FIGS. 11 through 14.

At 1825, the base station may communicate the wireless communications using the first beam pair during the first subset of aggregated slots and the second beam pair during the second subset of aggregated slots. The operations of 1825 may be performed according to the methods described herein. In some examples, aspects of the operations of 1825 may be performed by a communications component as described with reference to FIGS. 11 through 14.

Figure 19:
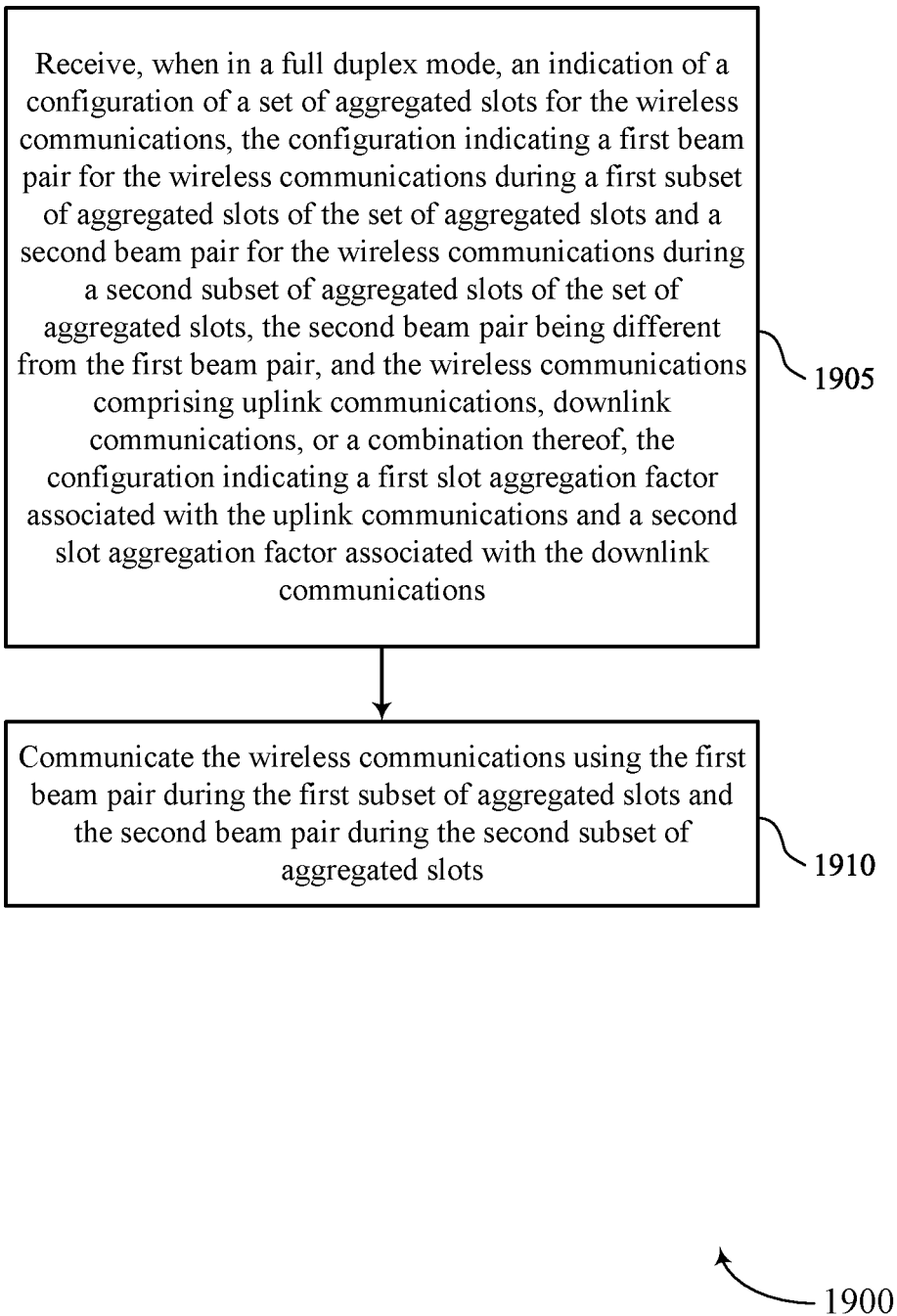

FIG. 19 shows a flowchart illustrating a method 1900 that supports techniques for slot aggregation in full duplex wireless communications systems in accordance with one or more aspects of the present disclosure. The operations of the method 1900 may be implemented by a UE or its components as described herein. For example, the operations of the method 1900 may be performed by a UE 115 as described with reference to FIGS. 1 through 14. In some examples, a UE may execute a set of instructions to control the functional elements of the UE to perform the described functions. Additionally or alternatively, the UE may perform aspects of the described functions using special-purpose hardware.

At 1905, the method may include receiving, when in a full duplex mode, an indication of a configuration of a set of aggregated slots for the wireless communications, the configuration indicating a first beam pair for the wireless communications during a first subset of aggregated slots of the set of aggregated slots and a second beam pair for the wireless communications during a second subset of aggregated slots of the set of aggregated slots, the second beam pair being different from the first beam pair, and the wireless communications including uplink communications, downlink communications, or a combination thereof, the configuration indicating a first slot aggregation factor associated with the uplink communications and a second slot aggregation factor associated with the downlink communications. The operations of 1905 may be performed in accordance with examples as disclosed herein. In some examples, aspects of the operations of 1905 may be performed by a configuration component 1345 as described with reference to FIG. 13.

At 1910, the method may include communicating the wireless communications using the first beam pair during the first subset of aggregated slots and the second beam pair during the second subset of aggregated slots. The operations of 1910 may be performed in accordance with examples as disclosed herein. In some examples, aspects of the operations of 1910 may be performed by a selection component 1330 as described with reference to FIG. 13.

Figure 20:
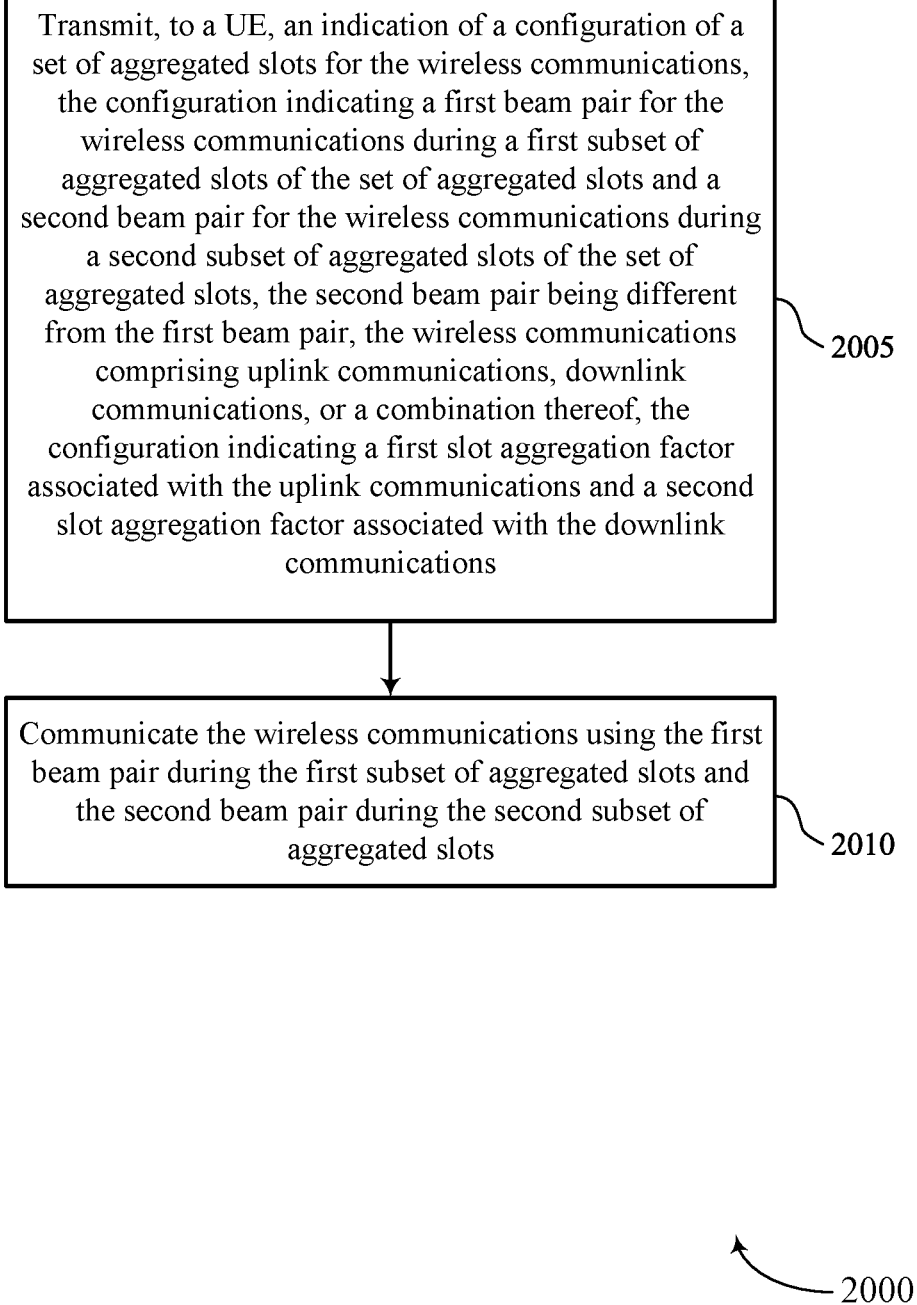

FIG. 20 shows a flowchart illustrating a method 2000 that supports techniques for slot aggregation in full duplex wireless communications systems in accordance with one or more aspects of the present disclosure. The operations of the method 2000 may be implemented by a base station or its components as described herein. For example, the operations of the method 2000 may be performed by a base station 105 as described with reference to FIGS. 1 through 10 and 15 through 18. In some examples, a base station may execute a set of instructions to control the functional elements of the base station to perform the described functions. Additionally or alternatively, the base station may perform aspects of the described functions using special-purpose hardware.

At 2005, the method may include transmitting, to a UE, an indication of a configuration of a set of aggregated slots for the wireless communications, the configuration indicating a first beam pair for the wireless communications during a first subset of aggregated slots of the set of aggregated slots and a second beam pair for the wireless communications during a second subset of aggregated slots of the set of aggregated slots, the second beam pair being different from the first beam pair, the wireless communications including uplink communications, downlink communications, or a combination thereof, the configuration indicating a first slot aggregation factor associated with the uplink communications and a second slot aggregation factor associated with the downlink communications. The operations of 2005 may be performed in accordance with examples as disclosed herein. In some examples, aspects of the operations of 2005 may be performed by an indication component 1725 as described with reference to FIG. 17.

At 2010, the method may include communicating the wireless communications using the first beam pair during the first subset of aggregated slots and the second beam pair during the second subset of aggregated slots. The operations of 2010 may be performed in accordance with examples as disclosed herein. In some examples, aspects of the operations of 2010 may be performed by a communications component 1730 as described with reference to FIG. 17.

It should be noted that the methods described herein describe possible implementations, and that the operations and the steps may be rearranged or otherwise modified and that other implementations are possible. Further, aspects from two or more of the methods may be combined.

Aspects of the following examples may be combined with any of the previous examples or aspects described herein.

Aspect 1: A method for wireless communications at a UE, comprising: receiving, when in a full duplex mode, an indication of a configuration of a set of aggregated slots for the wireless communications, the configuration indicating a first beam pair for the wireless communications during a first subset of aggregated slots of the set of aggregated slots and a second beam pair for the wireless communications during a second subset of aggregated slots of the set of aggregated slots, the second beam pair being different from the first beam pair, and the wireless communications comprising uplink communications, downlink communications, or a combination thereof, the configuration indicating a first slot aggregation factor associated with the uplink communications and a second slot aggregation factor associated with the downlink communications; and communicating the wireless communications using the first beam pair during the first subset of aggregated slots and the second beam pair during the second subset of aggregated slots.

Aspect 2: The method of aspect 1, wherein the first slot aggregation factor and the second slot aggregation factor are based at least in part on the configuration, and communicating the wireless communications using the first beam pair during the first subset of aggregated slots is based at least in part on the first slot aggregation factor and communicating the wireless communications using the second beam pair during the second subset of aggregated slots is based at least in part on the second slot aggregation factor.

Aspect 3: The method of any of aspects 1 through 2, wherein the first slot aggregation factor, the second slot aggregation factor, or both, indicates a single repetition, a plurality of repetitions, or a combination thereof.

Aspect 4: The method of any of aspects 1 through 3, further comprising: selecting a first beam for the uplink communications and a second beam for the downlink communications based at least in part on the first subset of aggregated slots of the set of aggregated slots, wherein communicating the wireless communications comprises: communicating the wireless communications using the first beam for the uplink communications and the second beam for the downlink communications during the first subset of aggregated slots.

Aspect 5: The method of aspect 4, further comprising: selecting the second beam for the uplink communications and the first beam for the downlink communications based at least in part on the second subset of aggregated slots of the set of aggregated slots, wherein communicating the wireless communications comprises: communicating the wireless communications using the second beam for the uplink communications and the first beam for the downlink communications during the second subset of aggregated slots.

Aspect 6: The method of any of aspects 1 through 5, further comprising: determining a beam order associated with the set of aggregated slots based at least in part on the configuration wherein to communicate the wireless communications using the first beam pair during the first subset of aggregated slots and the second beam pair during the second subset of aggregated slots is based at least in part on the determined beam order.

Aspect 7: The method of any of aspects 1 through 6, further comprising: receiving an RRC message, a MAC-CE message, or a DCI message, or a combination thereof, comprising the indication of the configuration of the set of aggregated slots for the uplink communications, the downlink communications, or both, wherein to communicate the wireless communications using the first beam pair during the first subset of aggregated slots and the second beam pair during the second subset of aggregated slots is based at least in part on the received RRC message, the MAC-CE message, or the DCI message, or a combination thereof.

Aspect 8: The method of any of aspects 1 though 7, wherein the second beam pair comprises an inverse of the first beam pair.

Aspect 9: The method of any of aspects 1 through 8, wherein each slot of the first subset of aggregated slots alternates with each slot of the second subset of aggregated slots.

Aspect 10: The method of any of aspects 1 through 9, wherein the first subset of aggregated slots, or the second subset of aggregated slots, or both, comprise one or more groups of slots.

Aspect 11: The method of any of aspects 1 through 10, further comprising: transmitting, during the first subset of aggregated slots, the uplink communications using a first beam, and, receiving, during the first subset of aggregated slots, the downlink communications using a second beam.

Aspect 12: The method of aspect 11, further comprising: transmitting, during the second subset of aggregated slots, the uplink communications using the second beam or a third beam, and, receiving, during the second subset of aggregated slots, the downlink communications using the first beam or a fourth beam.

Aspect 13: A method for wireless communications at a base station, comprising: transmitting, to a UE, an indication of a configuration of a set of aggregated slots for the wireless communications, the configuration indicating a first beam pair for the wireless communications during a first subset of aggregated slots of the set of aggregated slots and a second beam pair for the wireless communications during a second subset of aggregated slots of the set of aggregated slots, the second beam pair being different from the first beam pair, the wireless communications comprising uplink communications, downlink communications, or a combination thereof, the configuration indicating a first slot aggregation factor associated with the uplink communications and a second slot aggregation factor associated with the downlink communications; and communicating the wireless communications using the first beam pair during the first subset of aggregated slots and the second beam pair during the second subset of aggregated slots.

Aspect 14: The method of aspect 13, wherein the first slot aggregation factor and the second slot aggregation factor are based at least in part on the configuration, and communicating the wireless communications using the first beam pair during the first subset of aggregated slots is based at least in part on the first slot aggregation factor and communicating the wireless communications using the second beam pair during the second subset of aggregated slots is based at least in part on the second slot aggregation factor.

Aspect 15: The method of any of aspects 13 through 14, wherein the first slot aggregation factor, the second slot aggregation factor, or both, indicates a single repetition, a plurality of repetitions, or a combination thereof.

Aspect 16: The method of any of aspects 13 through 15, further comprising: selecting a first beam for the uplink communications and a second beam for the downlink communications based at least in part on the first subset of aggregated slots of the set of aggregated slots, wherein communicating the wireless communications comprises: communicating the wireless communications using the first beam for the uplink communications and the second beam for the downlink communications during the first subset of aggregated slots.

Aspect 17: The method of aspect 16, further comprising: selecting the second beam for the uplink communications and the first beam for the downlink communications based at least in part on the second subset of aggregated slots of the set of aggregated slots, wherein communicating the wireless communications comprises: communicating the wireless communications using the second beam for the uplink communications and the first beam for the downlink communications during the second subset of aggregated slots.

Aspect 18: The method of any of aspects 13 through 17, further comprising: determining a beam order associated with the set of aggregated slots based at least in part on the configuration wherein to communicate the wireless communications using the first beam pair during the first subset of aggregated slots and the second beam pair during the second subset of aggregated slots is based at least in part on the determined beam order.

Aspect 19: The method of any of aspects 13 through 18, further comprising: transmitting an RRC message, a MAC-CE message, or a DCI message, or a combination thereof, comprising the indication of the configuration of the set of aggregated slots for the uplink communications, the downlink communications, or both, wherein to communicate the wireless communications using the first beam pair during the first subset of aggregated slots and the second beam pair during the second subset of aggregated slots is based at least in part on the transmitted RRC message, the MAC-CE message, or the DCI message, or a combination thereof.

Aspect 20: The method of any of aspects 13 though 19, wherein the second beam pair comprises an inverse of the first beam pair.

Aspect 21: The method of any of aspects 13 through 20, wherein each slot of the first subset of aggregated slots alternates with each slot of the second subset of aggregated slots.

Aspect 22: The method of any of aspects 13 through 21, wherein the first subset of aggregated slots, or the second subset of aggregated slots, or both, comprise one or more groups of slots.

Aspect 23: The method of any of aspects 13 through 22, further comprising: receiving, during the first subset of aggregated slots, the uplink communications using a first beam, and, transmitting, during the first subset of aggregated slots, the downlink communications using a second beam.

Aspect 24: The method of aspect 23, further comprising: receiving, during the second subset of aggregated slots, the uplink communications using the second beam or a third beam, and, transmitting, during the second subset of aggregated slots, the downlink communications using the first beam or a fourth beam.

Aspect 25: An apparatus for wireless communications at a UE, comprising a processor; memory coupled to the processor, the processor and memory configured to perform a method of any of aspects 1 through 12.

Aspect 26: An apparatus for wireless communications at a UE, comprising at least one means for performing a method of any of aspects 1 through 12.

Aspect 27: A non-transitory computer-readable medium storing code for wireless communications at a UE, the code comprising instructions executable by a processor to perform a method of any of aspects 1 through 12.

Aspect 28: An apparatus for wireless communications at a base station, comprising a processor; memory coupled to the processor, the processor and memory configured to perform a method of any of aspects 13 through 24.

Aspect 29: An apparatus for wireless communications at a base station, comprising at least one means for performing a method of any of aspects 13 through 24.

Aspect 30: A non-transitory computer-readable medium storing code for wireless communications at a base station, the code comprising instructions executable by a processor to perform a method of any of aspects 13 through 24.

Aspect 31: A method for wireless communications at a UE operating in a full duplex mode, comprising: receiving an indication of a configuration of a set of aggregated slots for the wireless communications; determining a first beam pair for the wireless communications during a first subset of aggregated slots of the set of aggregated slots based at least in part on the configuration, the wireless communications comprising uplink communications, downlink communications, or both; determining a second beam pair for the wireless communications during a second subset of aggregated slots of the set of aggregated slot based at least in part on the configuration, the second beam pair different from the first beam pair; and communicating the wireless communications using the first beam pair during the first subset of aggregated slots and the second beam pair during the second subset of aggregated slots.

Aspect 32: The method of aspect 31, further comprising: selecting a first beam for the uplink communications and a second beam for the downlink communications based at least in part on the first subset of aggregated slots of the set of aggregated slots, wherein communicating the wireless communications comprises: communicating the wireless communications using the first beam for the uplink communications and the second beam for the downlink communications during the first subset of aggregated slots.

Aspect 33: The method of aspect 32, further comprising: selecting the second beam for the uplink communications and the first beam for the downlink communications based at least in part on the second subset of aggregated slots of the set of aggregated slots, wherein communicating the wireless communications comprises: communicating the wireless communications using the second beam for the uplink communications and the first beam for the downlink communications during the second subset of aggregated slots.

Aspect 34: The method of any one of aspects 31 through 33, further comprising: determining a slot aggregation factor based at least in part on the configuration, wherein communicating the wireless communications using the first beam pair during the first subset of aggregated slots and the second beam pair during the second subset of aggregated slots is based at least in part on the determined slot aggregation factor.

Aspect 35: The method of any one of aspects 31 through 34, further comprising: determining a first slot aggregation factor associated with the uplink communications and a second slot aggregation factor associated with the downlink communications.

Aspect 36: The method of any one of aspects 31 through 35, wherein the configuration indicates the first slot aggregation factor, the second slot aggregation factor, or both.

Aspect 37: The method of any one of aspects 31 through 36, wherein the first slot aggregation factor, the second slot aggregation factor, or both indicates a single repetition, a plurality of repetitions, or a combination thereof.

Aspect 38: The method of any one of aspects 31 through 37, further comprising: determining a beam order associated with the set of aggregated slots based at least in part on the configuration, wherein communicating the wireless communications using the first beam pair during the first subset of aggregated slots and the second beam pair during the second subset of aggregated slots is based at least in part on the determined beam order.

Aspect 39: The method of any one of aspects 31 through 38, further comprising: receiving an RRC message, a MAC-CE message, or a DCI message, or a combination thereof, comprising the indication of the configuration of the set of aggregated slots for the uplink communications, the downlink communications, or both, wherein communicating the wireless communications using the first beam pair during the first subset of aggregated slots and the second beam pair during the second subset of aggregated slots is based at least in part on the received RRC message, the MAC-CE message, or the DCI message, or a combination thereof.

Aspect 40: The method of any one of aspects 31 through 39, wherein the first subset of aggregated slots is different from the second subset of aggregated slots.

Aspect 41: The method of any one of aspects 31 through 40, wherein the second beam pair comprises an inverse of the first beam pair.

Aspect 42: The method of any one of aspects 31 through 41, wherein each slot of the first subset of aggregated slots alternates with each slot of the second subset of aggregated slots.

Aspect 43: The method of any one of aspects 31 through 42, wherein the first subset of aggregated slots, or the second subset of aggregated slots, or both, comprise one or more groups of slots.

Aspect 44: The method of any one of aspects 31 through 43, further comprising: transmitting, during the first subset of aggregated slots, the uplink communications using a first beam; and receiving, during the first subset of aggregated slots, the downlink communications using a second beam.

Aspect 45: The method of any one of aspects 31 through 44, further comprising: transmitting, during the second subset of aggregated slots, the uplink communications using the second beam or a third beam; and receiving, during the second subset of aggregated slots, the downlink communications using the first beam or a fourth beam.

Aspect 46: A method for wireless communications at a base station, comprising: transmitting, to a UE, an indication of a configuration of a set of aggregated slots for the wireless communications when the UE is operating in a full duplex mode; determining a first beam pair for the wireless communications during a first subset of aggregated slots of the set of aggregated slots, the wireless communications comprising uplink communications, downlink communications, or both; determining a second beam pair for the wireless communications during a second subset of aggregated slots of the set of aggregated slot, the second beam pair different from the first beam pair; and communicating the wireless communications using the first beam pair during the first subset of aggregated slots and the second beam pair during the second subset of aggregated slots.

Aspect 47: The method of aspect 46, further comprising: selecting a first beam for the uplink communications and a second beam for the downlink communications based at least in part on the first subset of aggregated slots of the set of aggregated slots, wherein communicating the wireless communications comprises: communicating the wireless communications using the first beam for the uplink communications and the second beam for the downlink communications during the first subset of aggregated slots.

Aspect 48: The method of aspect 47, further comprising: selecting the second beam for the uplink communications and the first beam for the downlink communications based at least in part on the second subset of aggregated slots of the set of aggregated slots, wherein communicating the wireless communications comprises: communicating the wireless communications using the second beam for the uplink communications and the first beam for the downlink communications during the second subset of aggregated slots.

Aspect 49: The method of any one of aspects 46 through 48, further comprising: determining a slot aggregation factor, wherein communicating the wireless communications using the first beam pair during the first subset of aggregated slots and the second beam pair during the second subset of aggregated slots is based at least in part on the determined slot aggregation factor.

Aspect 50: The method of any one of aspects 46 through 49, further comprising: determining a first slot aggregation factor associated with the uplink communications and a second slot aggregation factor associated with the downlink communications.

Aspect 51: The method of any one of aspects 46 through 50, wherein the configuration indicates the first slot aggregation factor, the second slot aggregation factor, or both.

Aspect 52: The method of any one of aspects 46 through 51, wherein the first slot aggregation factor, the second slot aggregation factor, or both indicates a single repetition, a plurality of repetitions, or a combination thereof.

Aspect 53: The method of any one of aspects 46 through 52, further comprising: determining a beam order associated with the set of aggregated slots based at least in part on the configuration, wherein communicating the wireless communications using the first beam pair during the first subset of aggregated slots and the second beam pair during the second subset of aggregated slots is based at least in part on the determined beam order.

Aspect 54: The method of any one of aspects 46 through 53, further comprising: transmitting an RRC message, a MAC-CE message, or a DCI message, or a combination thereof, comprising the indication of the configuration of the set of aggregated slots for the uplink communications, the downlink communications, or both, wherein communicating the wireless communications using the first beam pair during the first subset of aggregated slots and the second beam pair during the second subset of aggregated slots is based at least in part on the transmitted RRC message, the MAC-CE message, or the DCI message, or a combination thereof.

Aspect 55: The method of any one of aspects 46 through 54, wherein the first subset of aggregated slots is different from the second subset of aggregated slots.

Aspect 56: The method of any one of aspects 46 through 55, wherein the second beam pair comprises an inverse of the first beam pair.

Aspect 57: The method of any one of aspects 46 through 56, wherein each slot of the first subset of aggregated slots alternates with each slot of the second subset of aggregated slots.

Aspect 58: The method of any one of aspects 46 through 57, wherein the first subset of aggregated slots, or the second subset of aggregated slots, or both, comprise one or more groups of slots.

Aspect 59: The method of any one of aspects 46 through 58, further comprising: receiving, during the first subset of aggregated slots, the uplink communications using a first beam; and transmitting, during the first subset of aggregated slots, the downlink communications using a second beam.

Aspect 60: The method of any one of aspects 46 through 59, further comprising: receiving, during the second subset of aggregated slots, the uplink communications using the second beam or a third beam; and transmitting, during the second subset of aggregated slots, the downlink communications using the first beam or a fourth beam.

Aspect 61: An apparatus for wireless communications at a UE comprising at least one means for performing a method of any one of Aspects 31 through 45.

Aspect 62: An apparatus for wireless communications at a UE comprising a processor and memory coupled to the processor, the processor and memory configured to perform a method of any one of aspects 31 through 45.

Aspect 63: A non-transitory computer-readable medium storing code for wireless communications at a UE, the code comprising instructions executable by a processor to perform a method of any one of aspects 31 through 45.

Aspect 64: An apparatus for wireless communications at a base station comprising at least one means for performing a method of any one of aspects 46 through 60.

Aspect 65: An apparatus for wireless communications at a base station comprising a processor and memory coupled to the processor, the processor and memory configured to perform a method of any one of aspects 46 through 60.

Aspect 66: A non-transitory computer-readable medium storing code for wireless communications at a base station, the code comprising instructions executable by a processor to perform a method of any one of aspects 46 through 60.

Aspect 67: A method for wireless communications at a UE operating in a full duplex mode, comprising: receiving, while operating in the full duplex mode, an indication of a configuration of a set of aggregated slots for the wireless communications, the configuration indicating a first beam pair for the wireless communications during a first subset of aggregated slots of the set of aggregated slots and a second beam pair for the wireless communications during a second subset of aggregated slots of the set of aggregated slots, the second beam pair being different from the first beam pair, and the wireless communications comprising uplink communications, downlink communications, or a combination thereof, the configuration indicating a first slot aggregation factor associated with the uplink communications and a second slot aggregation factor associated with the downlink communications; and communicating the wireless communications using the first beam pair during the first subset of aggregated slots and the second beam pair during the second subset of aggregated slots.

Aspect 68: The method of aspect 67, wherein the first slot aggregation factor and the second slot aggregation factor are based at least in part on the configuration, and communicating the wireless communications using the first beam pair during the first subset of aggregated slots is based at least in part on the first slot aggregation factor and communicating the wireless communications using the second beam pair during the second subset of aggregated slots is based at least in part on the second slot aggregation factor.

Aspect 69: The method of any of aspects 67 through 68, wherein the first slot aggregation factor, the second slot aggregation factor, or both, indicates a single repetition, a plurality of repetitions, or a combination thereof.

Aspect 70: The method of any of aspects 67 through 69, further comprising: selecting a first beam for the uplink communications and a second beam for the downlink communications based at least in part on the first subset of aggregated slots of the set of aggregated slots, wherein communicating the wireless communications comprises: communicating the wireless communications using the first beam for the uplink communications and the second beam for the downlink communications during the first subset of aggregated slots.

Aspect 71: The method of aspect 70, further comprising: selecting the second beam for the uplink communications and the first beam for the downlink communications based at least in part on the second subset of aggregated slots of the set of aggregated slots, wherein communicating the wireless communications comprises: communicating the wireless communications using the second beam for the uplink communications and the first beam for the downlink communications during the second subset of aggregated slots.

Aspect 72: The method of any of aspects 67 through 71, further comprising: determining a beam order associated with the set of aggregated slots based at least in part on the configuration wherein to communicate the wireless communications using the first beam pair during the first subset of aggregated slots and the second beam pair during the second subset of aggregated slots is based at least in part on the determined beam order.

Aspect 73: The method of any of aspects 67 through 72, further comprising: receiving an RRC message, a MAC-CE message, or a DCI message, or a combination thereof, comprising the indication of the configuration of the set of aggregated slots for the uplink communications, the downlink communications, or both, wherein to communicate the wireless communications using the first beam pair during the first subset of aggregated slots and the second beam pair during the second subset of aggregated slots is based at least in part on the received RRC message, the MAC-CE message, or the DCI message, or a combination thereof, wherein the second beam pair comprises an inverse of the first beam pair.

Aspect 74: The method of any of aspects 67 through 73, wherein each slot of the first subset of aggregated slots alternates with each slot of the second subset of aggregated slots.

Aspect 75: The method of any of aspects 67 through 74, wherein the first subset of aggregated slots, or the second subset of aggregated slots, or both, comprise one or more groups of slots.

Aspect 76: The method of any of aspects 67 through 75, further comprising: transmitting, during the first subset of aggregated slots, the uplink communications using a first beam, and, receiving, during the first subset of aggregated slots, the downlink communications using a second beam.

Aspect 77: The method of aspect 76, further comprising: transmitting, during the second subset of aggregated slots, the uplink communications using the second beam or a third beam, and, receiving, during the second subset of aggregated slots, the downlink communications using the first beam or a fourth beam.

Aspect 78: A method for wireless communications at a base station, comprising: transmitting, to a UE, an indication of a configuration of a set of aggregated slots for the wireless communications when the UE is operating in a full duplex mode, the configuration indicating a first beam pair for the wireless communications during a first subset of aggregated slots of the set of aggregated slots and a second beam pair for the wireless communications during a second subset of aggregated slots of the set of aggregated slots, the second beam pair being different from the first beam pair, the wireless communications comprising uplink communications, downlink communications, or a combination thereof, the configuration indicating a first slot aggregation factor associated with the uplink communications and a second slot aggregation factor associated with the downlink communications; and communicating the wireless communications using the first beam pair during the first subset of aggregated slots and the second beam pair during the second subset of aggregated slots.

Aspect 79: The method of aspect 78, wherein the first slot aggregation factor and the second slot aggregation factor are based at least in part on the configuration, and communicating the wireless communications using the first beam pair during the first subset of aggregated slots is based at least in part on the first slot aggregation factor and communicating the wireless communications using the second beam pair during the second subset of aggregated slots is based at least in part on the second slot aggregation factor.

Aspect 80: The method of any of aspects 78 through 79, wherein the first slot aggregation factor, the second slot aggregation factor, or both, indicates a single repetition, a plurality of repetitions, or a combination thereof.

Aspect 81: The method of any of aspects 78 through 80, further comprising: selecting a first beam for the uplink communications and a second beam for the downlink communications based at least in part on the first subset of aggregated slots of the set of aggregated slots, wherein communicating the wireless communications comprises: communicating the wireless communications using the first beam for the uplink communications and the second beam for the downlink communications during the first subset of aggregated slots.

Aspect 82: The method of aspect 81, further comprising: selecting the second beam for the uplink communications and the first beam for the downlink communications based at least in part on the second subset of aggregated slots of the set of aggregated slots, wherein communicating the wireless communications comprises: communicating the wireless communications using the second beam for the uplink communications and the first beam for the downlink communications during the second subset of aggregated slots.

Aspect 83: The method of any of aspects 78 through 82, further comprising: determining a beam order associated with the set of aggregated slots based at least in part on the configuration wherein to communicate the wireless communications using the first beam pair during the first subset of aggregated slots and the second beam pair during the second subset of aggregated slots is based at least in part on the determined beam order.

Aspect 84: The method of any of aspects 78 through 83, further comprising: transmitting an RRC message, a MAC-CE message, or a DCI message, or a combination thereof, comprising the indication of the configuration of the set of aggregated slots for the uplink communications, the downlink communications, or both, wherein to communicate the wireless communications using the first beam pair during the first subset of aggregated slots and the second beam pair during the second subset of aggregated slots is based at least in part on the transmitted RRC message, the MAC-CE message, or the DCI message, or a combination thereof.

Aspect 85: The method of any of aspects 78 though 84, wherein the second beam pair comprises an inverse of the first beam pair.

Aspect 86: The method of any of aspects 78 through 85, wherein each slot of the first subset of aggregated slots alternates with each slot of the second subset of aggregated slots.

Aspect 87: The method of any of aspects 78 through 86, wherein the first subset of aggregated slots, or the second subset of aggregated slots, or both, comprise one or more groups of slots.

Aspect 88: The method of any of aspects 78 through 87, further comprising: receiving, during the first subset of aggregated slots, the uplink communications using a first beam, and, transmitting, during the first subset of aggregated slots, the downlink communications using a second beam.

Aspect 89: The method of aspect 88, further comprising: receiving, during the second subset of aggregated slots, the uplink communications using the second beam or a third beam, and, transmitting, during the second subset of aggregated slots, the downlink communications using the first beam or a fourth beam.

Aspect 90: An apparatus for wireless communications at a UE operating in a full duplex mode, comprising a processor; memory coupled to the processor, the processor and memory configured to perform a method of any of aspects 67 through 77.

Aspect 91: An apparatus for wireless communications at a UE operating in a full duplex mode, comprising at least one means for performing a method of any of aspects 67 through 77.

Aspect 92: A non-transitory computer-readable medium storing code for wireless communications at a UE operating in a full duplex mode, the code comprising instructions executable by a processor to perform a method of any of aspects 67 through 77.

Aspect 93: An apparatus for wireless communications at a base station, comprising a processor; memory coupled to the processor, the processor and memory configured to perform a method of any of aspects 78 through 89.

Aspect 94: An apparatus for wireless communications at a base station, comprising at least one means for performing a method of any of aspects 78 through 89.

Aspect 95: A non-transitory computer-readable medium storing code for wireless communications at a base station, the code comprising instructions executable by a processor to perform a method of any of aspects 78 through 89.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein. Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication at a user equipment (UE), comprising:
   one or more memories; and
   one or more processors coupled with the one or more memories and configured to cause the UE to:
      receive, when in a full duplex mode, an indication of a configuration of a set of aggregated slots for full duplex communication, wherein the configuration indicates a first beam pair for the full duplex communication over a first subset of aggregated slots of the set of aggregated slots, a second beam pair for the full duplex communication over a second subset of aggregated slots of the set of aggregated slots, a first aggregation factor associated with uplink communication of the full duplex communication, and a second aggregation factor associated with downlink communication of the full duplex communication, the second beam pair different from the first beam pair; and
      communicate via the first beam pair over the first subset of aggregated slots and the second beam pair over the second subset of aggregated slots, wherein, to communicate, the one or more processors are configured to cause the UE to:
         transmit, over the first subset of aggregated slots, the uplink communication via a first beam of the first beam pair; and
         receive, over the first subset of aggregated slots, the downlink communication via a second beam of the first beam pair.

2. The apparatus of claim 1, wherein the first aggregation factor and the second aggregation factor are based at least in part on the configuration, and wherein to communicate the uplink communication is based at least in part on the first aggregation factor, and to communicate the downlink communication is based at least in part on the second aggregation factor.

3. The apparatus of claim 1, wherein the first aggregation factor, the second aggregation factor, or both, indicate a single repetition, a plurality of repetitions, or a combination thereof.

4. The apparatus of claim 1, wherein the one or more processors are further configured to cause the UE to:
   select the first beam for the uplink communication and the second beam for the downlink communication based at least in part on the first subset of aggregated slots of the set of aggregated slots, wherein, to communicate, the one or more processors are further configured to cause the UE to:
      communicate via the first beam for the uplink communication and the second beam for the downlink communication over the first subset of aggregated slots.

5. The apparatus of claim 4, wherein the one or more processors are further configured to cause the UE to:
   select the second beam for the uplink communication and the first beam for the downlink communication based at least in part on the second subset of aggregated slots of the set of aggregated slots, wherein, to communicate, the one or more processors are further configured to cause the UE to:
      communicate via the second beam for the uplink communication and the first beam for the downlink communication over the second subset of aggregated slots.

6. The apparatus of claim 1, wherein the one or more processors are further configured to cause the UE to:
determine a beam order associated with the set of aggregated slots based at least in part on the configuration, wherein to communicate via the first beam pair over the first subset of aggregated slots and the second beam pair over the second subset of aggregated slots is based at least in part on the beam order.

7. The apparatus of claim 1, further comprising one or more antennas configured to:
receive a radio resource control message, a medium access control-control element (MAC-CE), or a downlink control information, or a combination thereof, comprising the indication of the configuration of the set of aggregated slots for the uplink communication, the downlink communication, or both,
wherein to communicate via the first beam pair over the first subset of aggregated slots and the second beam pair over the second subset of aggregated slots is based at least in part on the radio resource control message, the MAC-CE, or the downlink control information, or a combination thereof.

8. The apparatus of claim 1, wherein the second beam pair comprises an inverse of the first beam pair.

9. The apparatus of claim 1, wherein each slot of the first subset of aggregated slots alternates with each slot of the second subset of aggregated slots.

10. The apparatus of claim 1, wherein the first subset of aggregated slots, or the second subset of aggregated slots, or both, comprise one or more groups of slots.

11. The apparatus of claim 1, wherein the one or more processors are further configured to cause the UE to:
transmit, over the second subset of aggregated slots, the uplink communication via the second beam of the first beam pair or a third beam of the second beam pair; and
receive, over the second subset of aggregated slots, the downlink communication via the first beam of the first beam pair or a fourth beam of the second beam pair.

12. An apparatus for wireless communication at a network device, comprising:
one or more memories; and
one or more processors coupled with the one or more memories and configured to cause the network device to:
output an indication of a configuration of a set of aggregated slots for full duplex communication, wherein the configuration indicates a first beam pair for the full duplex communication over a first subset of aggregated slots of the set of aggregated slots, a second beam pair for the full duplex communication over a second subset of aggregated slots of the set of aggregated slots, a first aggregation factor associated with uplink communication of the full duplex communication, and a second aggregation factor associated with downlink communication, the second beam pair different from the first beam pair; and
communicate via the first beam pair over the first subset of aggregated slots and the second beam pair over the second subset of aggregated slots, wherein, to communicate, the one or more processors are configured to cause the network device to:
obtain, over the first subset of aggregated slots, the uplink communication via a first beam of the first beam pair; and
output, over the first subset of aggregated slots, the downlink communication via a second beam of the first beam pair.

13. The apparatus of claim 12, wherein the first aggregation factor and the second aggregation factor are based at least in part on the configuration, and wherein to communicate the uplink communication is based at least in part on the first aggregation factor, and to communicate the downlink communication is based at least in part on the second aggregation factor.

14. The apparatus of claim 12, wherein the first aggregation factor or the second aggregation factor, or both, indicates a single repetition, a plurality of repetitions, or a combination thereof.

15. The apparatus of claim 12, wherein the one or more processors are further configured to cause the network device to:
select the first beam for the uplink communication and the second beam for the downlink communication based at least in part on the first subset of aggregated slots of the set of aggregated slots, wherein, to communicate, the one or more processors are further configured to cause the network device to:
communicate via the first beam for the uplink communication and the second beam for the downlink communication over the first subset of aggregated slots.

16. The apparatus of claim 15, wherein the one or more processors are further configured to cause the network device to:
select the second beam for the uplink communication and the first beam for the downlink communication based at least in part on the second subset of aggregated slots of the set of aggregated slots, wherein, to communicate, the one or more processors are further configured to cause the network device to:
communicate via the second beam for the uplink communication and the first beam for the downlink communication over the second subset of aggregated slots.

17. The apparatus of claim 12, wherein the one or more processors are further configured to cause the network device to:
determine a beam order associated with the set of aggregated slots based at least in part on the configuration, wherein to communicate via the first beam pair over the first subset of aggregated slots and the second beam pair over the second subset of aggregated slots is based at least in part on the beam order.

18. The apparatus of claim 12, wherein the one or more processors are further configured to cause the network device to:
output a radio resource control message, a medium access control-control element (MAC-CE), or a downlink control information, or a combination thereof, comprising the indication of the configuration of the set of aggregated slots for the uplink communication, the downlink communication, or both, wherein to communicate via the first beam pair over the first subset of aggregated slots and the second beam pair over the second subset of aggregated slots is based at least in part on the radio resource control message, the MAC-CE, or the downlink control information, or a combination thereof.

19. The apparatus of claim 12, wherein the second beam pair comprises an inverse of the first beam pair.

20. The apparatus of claim 12, wherein each slot of the first subset of aggregated slots alternates with each slot of the second subset of aggregated slots.

21. The apparatus of claim 12, wherein the first subset of aggregated slots, or the second subset of aggregated slots, or both, comprise one or more groups of slots.

22. The apparatus of claim 12, wherein the one or more processors are further configured to cause the network device to:
obtain, over the second subset of aggregated slots, the uplink communication via the second beam of the first beam pair or a third beam of the second beam pair; and
output, over the second subset of aggregated slots, the downlink communication via the first beam of the first beam pair or a fourth beam of the second beam pair.

23. A method for wireless communication at a user equipment (UE), comprising:
receiving, when in a full duplex mode, an indication of a configuration of a set of aggregated slots for full duplex communication, wherein the configuration indicates a first beam pair for the full duplex communication over a first subset of aggregated slots of the set of aggregated slots, a second beam pair for the full duplex communication over a second subset of aggregated slots of the set of aggregated slots, a first aggregation factor associated with uplink communication, and a second aggregation factor associated with downlink communication, the second beam pair being different from the first beam pair; and
communicating via the first beam pair over the first subset of aggregated slots and the second beam pair over the second subset of aggregated slots, the communicating comprising:
transmitting, over the first subset of aggregated slots, the uplink communication via a first beam of the first beam pair; and
receiving, over the first subset of aggregated slots, the downlink communication via a second beam of the first beam pair.

24. The method of claim 23, the first aggregation factor and the second aggregation factor being based at least in part on the configuration, the communicating of the uplink communication being based at least in part on the first aggregation factor, and the communicating of the downlink communication being based at least in part on the second aggregation factor.

25. The method of claim 23, the first aggregation factor, the second aggregation factor, or both, indicating a single repetition, a plurality of repetitions, or a combination thereof.

26. The method of claim 23, further comprising:
selecting the first beam for the uplink communication and the second beam for the downlink communication based at least in part on the first subset of aggregated slots of the set of aggregated slots, the communicating comprising:
communicating via the first beam for the uplink communication and the second beam for the downlink communication over the first subset of aggregated slots.

27. The method of claim 26, further comprising:
selecting the second beam for the uplink communication and the first beam for the downlink communication based at least in part on the second subset of aggregated slots of the set of aggregated slots, the communicating comprising:
communicating via the second beam for the uplink communication and the first beam for the downlink communication over the second subset of aggregated slots.

28. The method of claim 23, further comprising:
determining a beam order associated with the set of aggregated slots based at least in part on the configuration, wherein communicating via the first beam pair over the first subset of aggregated slots and the second beam pair over the second subset of aggregated slots is based at least in part on the beam order.

29. The method of claim 23, further comprising:
receiving a radio resource control message, a medium access control-control element (MAC-CE), or a downlink control information, or a combination thereof, comprising the indication of the configuration of the set of aggregated slots for the uplink communication, the downlink communication, or both,
wherein communicating via the first beam pair over the first subset of aggregated slots and the second beam pair over the second subset of aggregated slots is based at least in part on the radio resource control message, the MAC-CE, or the downlink control information, or a combination thereof.

30. The method of claim 23, wherein the second beam pair comprises an inverse of the first beam pair.

31. The method of claim 23, wherein each slot of the first subset of aggregated slots alternates with each slot of the second subset of aggregated slots.

32. The method of claim 23, wherein the first subset of aggregated slots, or the second subset of aggregated slots, or both, comprise one or more groups of slots.

33. The method of claim 23, further comprising:
transmitting, over the second subset of aggregated slots, the uplink communication via the second beam of the first beam pair or a third beam of the second beam pair; and
receiving, over the second subset of aggregated slots, the downlink communication via the first beam of the first beam pair or a fourth beam of the second beam pair.

34. A method for wireless communication at a network device, comprising:
outputting an indication of a configuration of a set of aggregated slots for full duplex communication, the configuration indicating a first beam pair for the full duplex communication over a first subset of aggregated slots of the set of aggregated slots, a second beam pair for the full duplex communication over a second subset of aggregated slots of the set of aggregated slots, a first aggregation factor associated with uplink communication, and a second aggregation factor associated with downlink communication, the second beam pair being different from the first beam pair; and
communicating via the first beam pair over the first subset of aggregated slots and the second beam pair over the second subset of aggregated slots, wherein the communicating comprises:
obtaining, over the first subset of aggregated slots, the uplink communication via a first beam of the first beam pair; and
outputting, over the first subset of aggregated slots, the downlink communication via a second beam of the first beam pair.

35. The method of claim 34, the first aggregation factor and the second aggregation factor being based at least in part on the configuration, the communicating of the uplink communication being based at least in part on the first aggregation factor, and the communicating of the downlink communication being based at least in part on the second aggregation factor.

36. The method of claim 34, wherein the first aggregation factor, the second aggregation factor, or both, indicates a single repetition, a plurality of repetitions, or a combination thereof.

37. The method of claim 34, further comprising:
selecting the first beam for the uplink communication and the second beam for the downlink communication based at least in part on the first subset of aggregated slots of the set of aggregated slots, the communicating comprising:
communicating via the first beam for the uplink communication and the second beam for the downlink communication over the first subset of aggregated slots.

38. The method of claim 37, further comprising:
selecting the second beam for the uplink communication and the first beam for the downlink communication based at least in part on the second subset of aggregated slots of the set of aggregated slots, the communicating comprising:
communicating via the second beam for the uplink communication and the first beam for the downlink communication over the second subset of aggregated slots.

39. The method of claim 34, further comprising:
determining a beam order associated with the set of aggregated slots based at least in part on the configuration, wherein to communicate via the first beam pair over the first subset of aggregated slots and the second beam pair over the second subset of aggregated slots is based at least in part on the beam order.

40. The method of claim 34, further comprising:
outputting a radio resource control message, a medium access control-control element (MAC-CE), or a downlink control information, or a combination thereof, comprising the indication of the configuration of the set of aggregated slots for the uplink communication, the downlink communication, or both, wherein communicating via the first beam pair over the first subset of aggregated slots and the second beam pair over the second subset of aggregated slots is based at least in part on the radio resource control message, the MAC-CE, or the downlink control information, or a combination thereof.

41. The method of claim 34, wherein the second beam pair comprises an inverse of the first beam pair.

42. The method of claim 34, wherein each slot of the first subset of aggregated slots alternates with each slot of the second subset of aggregated slots.

43. The method of claim 34, wherein the first subset of aggregated slots, or the second subset of aggregated slots, or both, comprise one or more groups of slots.

44. The method of claim 34, further comprising:
obtaining, over the second subset of aggregated slots, the uplink communication via the second beam of the first beam pair or a third beam of the second beam pair; and
outputting, over the second subset of aggregated slots, the downlink communication via the first beam of the first beam pair or a fourth beam of the second beam pair.

45. A non-transitory computer-readable medium storing code for wireless communication at a user equipment (UE), the code comprising instructions executable by one or more processors to cause the UE to:
receive, when in a full duplex mode, an indication of a configuration of a set of aggregated slots for full duplex communication, wherein the configuration indicates a first beam pair for the full duplex communication over a first subset of aggregated slots of the set of aggregated slots, a second beam pair for the full duplex communication over a second subset of aggregated slots of the set of aggregated slots, a first aggregation factor associated with uplink communication of the full duplex communication, and a second aggregation factor associated with downlink communication of the full duplex communication, the second beam pair different from the first beam pair; and
communicate via the first beam pair over the first subset of aggregated slots and the second beam pair over the second subset of aggregated slots, wherein, to communicate, the one or more processors are configured to cause the UE to:
transmit, over the first subset of aggregated slots, the uplink communication via a first beam of the first beam pair; and
receive, over the first subset of aggregated slots, the downlink communication via a second beam of the first beam pair.

46. The non-transitory computer-readable medium of claim 45, wherein the first aggregation factor and the second aggregation factor are based at least in part on the configuration, communication of the uplink communication is based at least in part on the first aggregation factor, and communication of the downlink communication is based at least in part on the second aggregation factor.

47. The non-transitory computer-readable medium of claim 45, wherein the first aggregation factor, the second aggregation factor, or both, indicates a single repetition, a plurality of repetitions, or a combination thereof.

48. A non-transitory computer-readable medium storing code for wireless communication at a network device, the code comprising instructions executable by one or more processors to cause the network device to:
output, when in a full duplex mode, an indication of a configuration of a set of aggregated slots for full duplex communication, wherein the configuration indicates a first beam pair for the full duplex communication over a first subset of aggregated slots of the set of aggregated slots, a second beam pair for the full duplex communication over a second subset of aggregated slots of the set of aggregated slots, a first aggregation factor associated with uplink communication of the full duplex communication, and a second aggregation factor associated with downlink communication of the full duplex communication, the second beam pair different from the first beam pair; and
communicate via the first beam pair over the first subset of aggregated slots and the second beam pair over the second subset of aggregated slots, wherein, to communicate, the one or more processors are configured to cause the network device to:
obtain, over the first subset of aggregated slots, the uplink communication via a first beam of the first beam pair; and
output, over the first subset of aggregated slots, the downlink communication via a second beam of the first beam pair.

49. The non-transitory computer-readable medium of claim 48, wherein the first aggregation factor and the second aggregation factor are based at least in part on the configuration, communication of the uplink communication is based at least in part on the first aggregation factor, and communication of the downlink communication is based at least in part on the second aggregation factor.

50. The non-transitory computer-readable medium of claim 48, wherein the first aggregation factor, the second aggregation factor, or both, indicates a single repetition, a plurality of repetitions, or a combination thereof.

* * * * *